US012641477B2

(12) United States Patent
Di Girolamo et al.

(10) Patent No.: US 12,641,477 B2
(45) Date of Patent: May 26, 2026

(54) COMMUNICATION OVER A MOBILE NETWORK WITH DUALSTEER FUNCTIONALITY

(71) Applicant: InterDigital Patent Holdings, Inc., Wilmington, DE (US)

(72) Inventors: Rocco Di Girolamo, Laval (CA); Xavier De Foy, Kirkland (CA); Guanzhou Wang, Brossard (CA); Saad Ahmad, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 318 days.

(21) Appl. No.: 18/501,941

(22) Filed: Nov. 3, 2023

(65) Prior Publication Data

US 2024/0155419 A1     May 9, 2024

Related U.S. Application Data

(60) Provisional application No. 63/422,313, filed on Nov. 3, 2022.

(51) Int. Cl.
     *H04W 28/02*     (2009.01)
(52) U.S. Cl.
     CPC .............................. *H04W 28/0268* (2013.01)
(58) Field of Classification Search
     CPC . H04W 28/0268; H04W 76/16; H04W 88/06; H04W 76/15; H04W 76/11
     See application file for complete search history.

(56) References Cited

U.S. PATENT DOCUMENTS

| | | | | |
|---|---|---|---|---|
| 11,832,323 | B2 * | 11/2023 | Foti ..................... | H04W 36/305 |
| 2019/0200266 | A1 * | 6/2019 | Jun ................... | H04W 36/0027 |
| 2020/0154389 | A1 * | 5/2020 | Karampatsis ....... | H04L 65/1073 |
| 2020/0236727 | A1 * | 7/2020 | Salkintzis ............. | H04W 48/18 |
| 2021/0168035 | A1 * | 6/2021 | Cui ..................... | H04L 41/0866 |
| 2021/0250409 | A1 * | 8/2021 | Huang-Fu ............. | H04L 67/147 |
| 2022/0272651 | A1 * | 8/2022 | Chun ................... | H04W 60/06 |

(Continued)

FOREIGN PATENT DOCUMENTS

| | | |
|---|---|---|
| WO | 2020168236 A1 | 8/2020 |
| WO | 2021163665 A1 | 8/2021 |

OTHER PUBLICATIONS

Cable Labs et al., "New use case for Inter-PLMN mobility scenario," 3GPP TSG-SA WG1 Meeting #99e, S1-222221, Electronic Meeting (Aug. 22-Sep. 1, 2022).

(Continued)

*Primary Examiner* — Cindy Trandai
(74) *Attorney, Agent, or Firm* — Volpe Koenig

(57)     ABSTRACT

An embodiment of a method for implementing by a Wireless Transmit-Receive Unit (WTRU) includes receiving, from a Primary Mobile Network (PMN), information related to a Secondary Mobile Network (SMN), selecting the PMN in response to the information related to the SMN, registering to the selected PMN, and, in response to a trigger, and based on a factor related to Quality of Service (QoS) and on the information related to the SMN, requesting establishment of a Multi-Access Protocol Data Unit (MA-PDU) session having DualSteer functionality and with an access leg over the registered PMN and with another access leg.

20 Claims, 11 Drawing Sheets

(56) References Cited

U.S. PATENT DOCUMENTS

| | | | | |
|---|---|---|---|---|
| 2023/0111913 A1* | 4/2023 | Hans | | H04W 76/12 |
| | | | | 370/331 |
| 2023/0113519 A1* | 4/2023 | Fernandez Alonso | | |
| | | | | H04W 76/11 |
| | | | | 370/329 |
| 2023/0144323 A1* | 5/2023 | Catovic | | H04W 8/183 |
| | | | | 370/329 |
| 2023/0217513 A1* | 7/2023 | Hashmi | | H04W 8/183 |
| 2024/0056938 A1* | 2/2024 | Alasti | | H04W 28/08 |
| 2024/0080791 A1* | 3/2024 | Aghili | | H04W 60/005 |
| 2024/0334364 A1* | 10/2024 | Nooren | | H04L 67/34 |
| 2024/0381219 A1* | 11/2024 | Tonesi | | H04W 40/02 |
| 2024/0389178 A1* | 11/2024 | Zia | | H04W 40/026 |
| 2025/0106162 A1* | 3/2025 | Di Girolamo | | H04W 24/08 |
| 2025/0294493 A1* | 9/2025 | Salkintzis | | H04W 88/06 |

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).

IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2020 (Dec. 3, 2020).

Interdigital et al., "New use case on Inter-PLMN scenario—TN and multiple NTN," 3GPP TSG-SA WG1 Meeting #101, S1-230021, Athens, Greece (Feb. 20-24, 2023).

Interdigital, "New use case on Inter-PLMN scenario—TN and multiple NTN," 3GPP TSG-SA WG1 Meeting #100, S1-223243, Toulouse, France (Nov. 14-18, 2022).

SA1 (from S1-221231), "New SID: Study on Upper layer traffic steering, switching and split over dual 3GPP access," 3GPP TSG Meeting #96e, SP-220445, Electronic Meeting (Jun. 7-10, 2022).

Third Generation Partnership Project, "Technical Specification Group Services and System Aspects; System architecture for the 5G System (5GS); Stage 2 (Release 17)," 3GPP TS 23.501 V17.6.0 (Sep. 2022).

Third Generation Partnership Project, "Technical Specification Group Services and System Aspects; System architecture for the 5G System (5GS); Stage 2 (Release 17)," 3GPP TS 23.501 V17.10.0 (Sep. 2023).

Third Generation Partnership Project, "Technical Specification Group Services and System Aspects; System architecture for the 5G System (5GS); Stage 2 (Release 18)," 3GPP TS 23.501 V18.3.0 (Sep. 2023).

Third Generation Partnership Project, "Technical Specification Group Services and System Aspects; Procedures for the 5G System (5GS); Stage 2 (Release 18)," 3GPP TS 23.502 V18.3.0 (Sep. 2023).

Third Generation Partnership Project, "Technical Specification Group Services and System Aspects; Procedures for the 5G System (5GS); Stage 2 (Release 17)," 3GPP TS 23.502 V17.10.0 (Sep. 2023).

Third Generation Partnership Project, "Technical Specification Group Services and System Aspects; Procedures for the 5G System (5GS); Stage 2 (Release 17)," 3GPP TS 23.502 V17.6.0 (Sep. 2022).

Third Generation Partnership Project, "Technical Specification Group Services and System Aspects; Policy and charging control framework for the 5G System (5GS); Stage 2 (Release 17)," 3GPP TS 23.503 V17.10.0 (Sep. 2023).

Third Generation Partnership Project, "Technical Specification Group Services and System Aspects; Policy and charging control framework for the 5G System (5GS); Stage 2 (Release 17)," 3GPP TS 23.503 V17.6.0 (Sep. 2022).

Third Generation Partnership Project, "Technical Specification Group Services and System Aspects; Policy and charging control framework for the 5G System (5GS); Stage 2 (Release 18)," 3GPP TS 23.503 V18.3.0 (Sep. 2023).

Third Generation Partnership Project, "Technical Specification Group Core Network and Terminals; Non-Access-Stratum (NAS) functions related to Mobile Station (MS) in idle mode (Release 18)," 3GPP TS 23.122 V18.0.0 (Sep. 2022).

Third Generation Partnership Project, "Technical Specification Group Core Network and Terminals; Non-Access-Stratum (NAS) functions related to Mobile Station (MS) in idle mode (Release 18)," 3GPP TS 23.122 V18.4.0 (Sep. 2023).

Third Generation Partnership Project, "Technical Specification Group TSG SA; Study on Upper layer traffic steer, switch and split over dual 3GPP access (Release 19)," 3GPP TR 22.841 V2.0.0 (Sep. 2023).

Third Generation Partnership Project, "Technical Specification Group TSG SA; Study on Upper layer traffic steer, switch and split over dual 3GPP access (Release 19)," 3GPP TR 22.841 V0.2.0 (Sep. 2022).

Third Generation Partnership Project, "Technical Specification Group Core Network and Terminals; Non-Access-Stratum (NAS) functions related to Mobile Station (MS) in idle mode (Release 17)," 3GPP TS 23.122 V17.9.0 (Dec. 2022).

Third Generation Partnership Project, "Technical Specification Group Core Network and Terminals; Non-Access-Stratum (NAS) functions related to Mobile Station (MS) in idle mode (Release 17)," 3GPP TS 23.122 V17.8.0 (Sep. 2022).

Third Generation Partnership Project, "Technical Specification Group Radio Access Network; NR; NR and NG-RAN Overall Description; Stage 2 (Release 17)," 3GPP TS 38.300 V17.6.0 (Sep. 2023).

Third Generation Partnership Project, "Technical Specification Group Radio Access Network; NR; NR and NG-RAN Overall Description; Stage 2 (Release 17)," 3GPP TS 38.300 V17.2.0 (Sep. 2022).

* cited by examiner

Figure 1C:
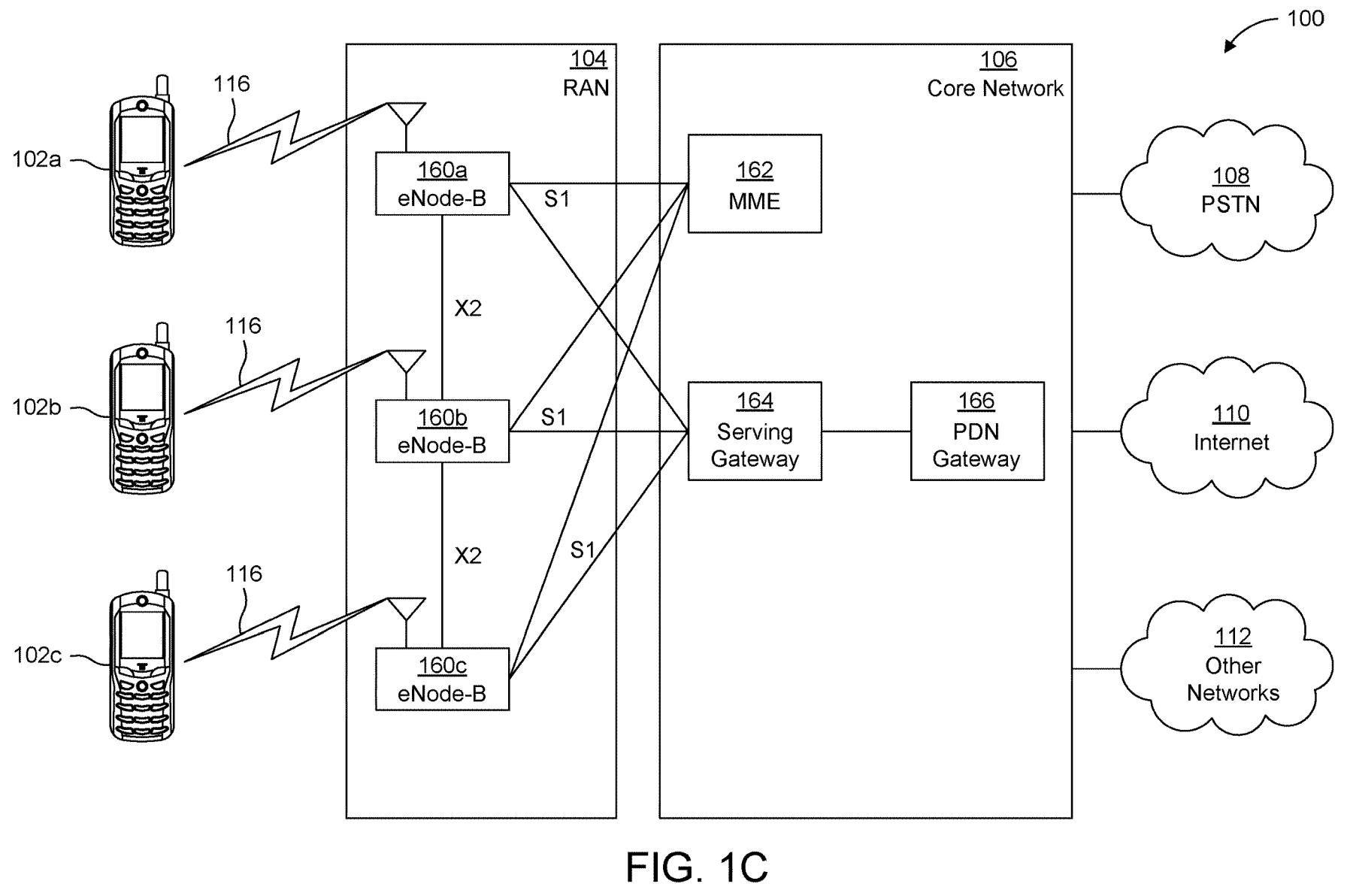

100

108 PSTN

110 Internet

112 Other Networks

106 Core Network

162 MME

164 Serving Gateway

166 PDN Gateway

104 RAN

S1

S1

S1

160a eNode-B 160b eNode-B 160c eNode-B

COMMUNICATION OVER A MOBILE NETWORK WITH DUALSTEER FUNCTIONALITY

CROSS-REFERENCE TO RELATED APPLICATIONS

This application claims the benefit of U.S. Provisional Application No. 63/422,313, filed Nov. 3, 2022, the contents of which are incorporated herein by reference.

SUMMARY

The present disclosure relates to the following information, which may be related to 5G Cellular and 5G Core Network, and may be suitable for use in consumer electronics equipment, smart phones, tablets, head-mounted displays, connected vehicles, drones, set-top boxes, and core networks.

ATSSS and DualSteer.

PLMN selection, Network selection in SNPN access mode, Secondary MN selection, Registration Procedure, PDU Session Establishment Procedure, PDU Session Modification Procedure, and WTRU Configuration Update Procedure.

And to enable DualSteer functionality, embodiments are proposed in the following areas.

Architecture to enable DualSteer functionality across two different Mobile Networks.

Procedures for WTRU to select and register with a primary Mobile Network.

Modified MA PDU session establishment procedures—triggers, content to message, and actions related to reception of response.

Procedures for WTRU to select and register with a secondary Mobile Network.

WTRU behavior/actions when operating over a Secondary Mobile Network.

An embodiment of a method includes receiving, by a WTRU, information for at least one SMN, initiating, by the WTRU, a MA-PDU session with DualSteer Functionality, selecting, by the WTRU, one of the at least one SMN, registering the WTRU with the selected one of the at least one SMN, and performing, by the WTRU, at least one operation related to the one of the at least one SMN with which the WTRU is registered.

Another embodiment of a method for implementing by a WTRU includes receiving, from a PMN to which the WTRU is registered, information related to an SMN and including an indication of an SMN selection rule, selecting an SMN in response to a bigger and to the SMN selection rule, registering to the selected SMN, and requesting establishment of an MA-PDU session having DualSteer functionality and with an access leg over the registered SMN and with another access leg over the registered PMN.

An embodiment of a method for implementing by a WTRU includes receiving, from a PMN, information related to an SMN, selecting the PMN in response to the information related to the SMN, registering to the selected PMN, and, in response to a bigger, and based on a factor related to QoS and on the information related to the SMN, requesting establishment of an MA-PDU session having DualSteer functionality and with an access leg over the registered PMN and with another access leg.

BRIEF DESCRIPTION OF THE DRAWINGS

A more detailed understanding may be had from the following description, given by way of example in conjunction with the accompanying drawings, wherein like reference numerals in the figures indicate like elements, and wherein:

FIG. 1C is a system diagram illustrating an example radio access network (RAN) and an example core network (CN) that may be used within the communications system illustrated in FIG. 1A according to an embodiment;

FIG. 1D is a system diagram illustrating a further example RAN and a further example CN that may be used within the communications system illustrated in FIG. 1A according to an embodiment;

DETAILED DESCRIPTION

Abbreviations and Acronyms

Figure 1A:
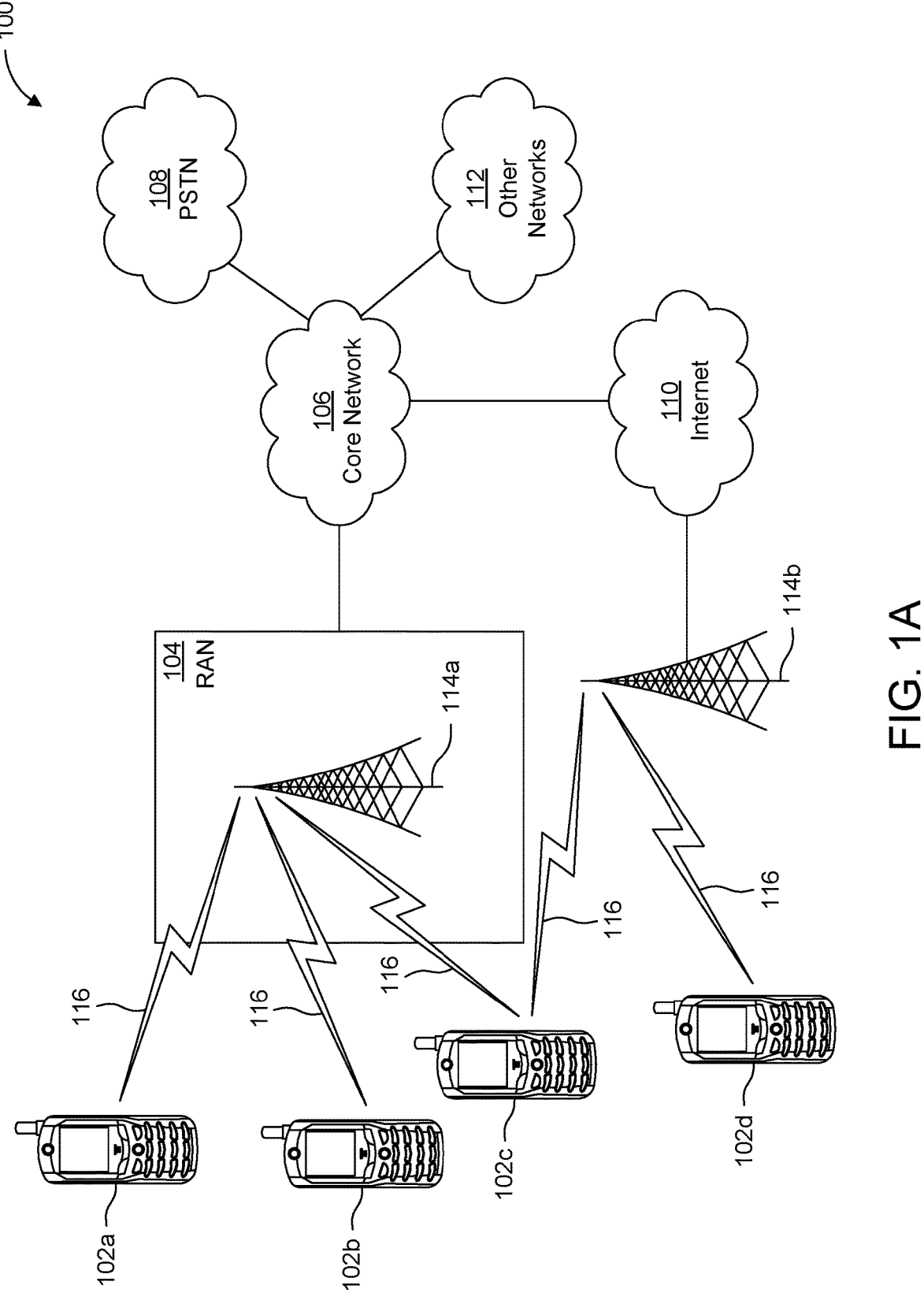
FIG. 1A is a system diagram illustrating an example communications system in which one or more disclosed embodiments may be implemented.

5QI 5G QoS Identifier
AMF Access and Mobility management Function
ATSSS Access Traffic Steering, Switching and Splitting
DN Data Network
DC Dual Connectivity
DRB Data Radio Bearer
EF Elementary File
eNB evolved Node B (Base Station)
gNB Next Generation Node B (Base Station)
GPRS General Packet Radio Services
HAPS High-Altitude Platform Station
HARQ Hybrid Automatic Repeat Request
HPLMN Home PLMN
LADN Local Area Data Network
LTE Long Term Evolution
MA-PDU Multi-Access PDU
MCC Mobile Country Code
MCG Master Cell Group
ME Mobile Equipment
MM Mobility Management
MN Mobile Network
MNC Mobile Network Code
MT Mobile Termination NAS Non-Access Stratum
NID Network ID
NPN Non-Public Network
NR New Radio
NSSAI Network Slice Selection Assistance Information
NTN Non-Terrestrial Network
PDU Protocol Data Unit
PLMN Public Land Mobile Network
PMF Performance Measurement Function
PMN Primary Mobile Network
PNI-NPN Public network integrated NPN
QoS Quality of Service
RAN Radio Access Network
RAT Radio Access Technology
RF Radio Frequency
SA-PDU Single-Access PDU
SCG Secondary Cell Group
SDAP Service Data Adaptation Protocol
SDF Service Data Flow
SM Session Management
SMF Session Management Function
SMN Secondary Mobile Network
SNPN Standalone NPN
S-NSSAI Single NSSAI
SO-SNPN Subscriber Owner SNPN
SST Slice/Service Type
TE Terminal Equipment
UE User Equipment
UPF User Plane Function
URI Universal Resource Identifier
USIM Universal Subscriber Identity Module
VPLMN Visitor PLMN
WTRU Wireless Transmit-Receive Unit FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using NR.

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WIMAX, E-UTRA, or WiFi radio technology.

The CN 106 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
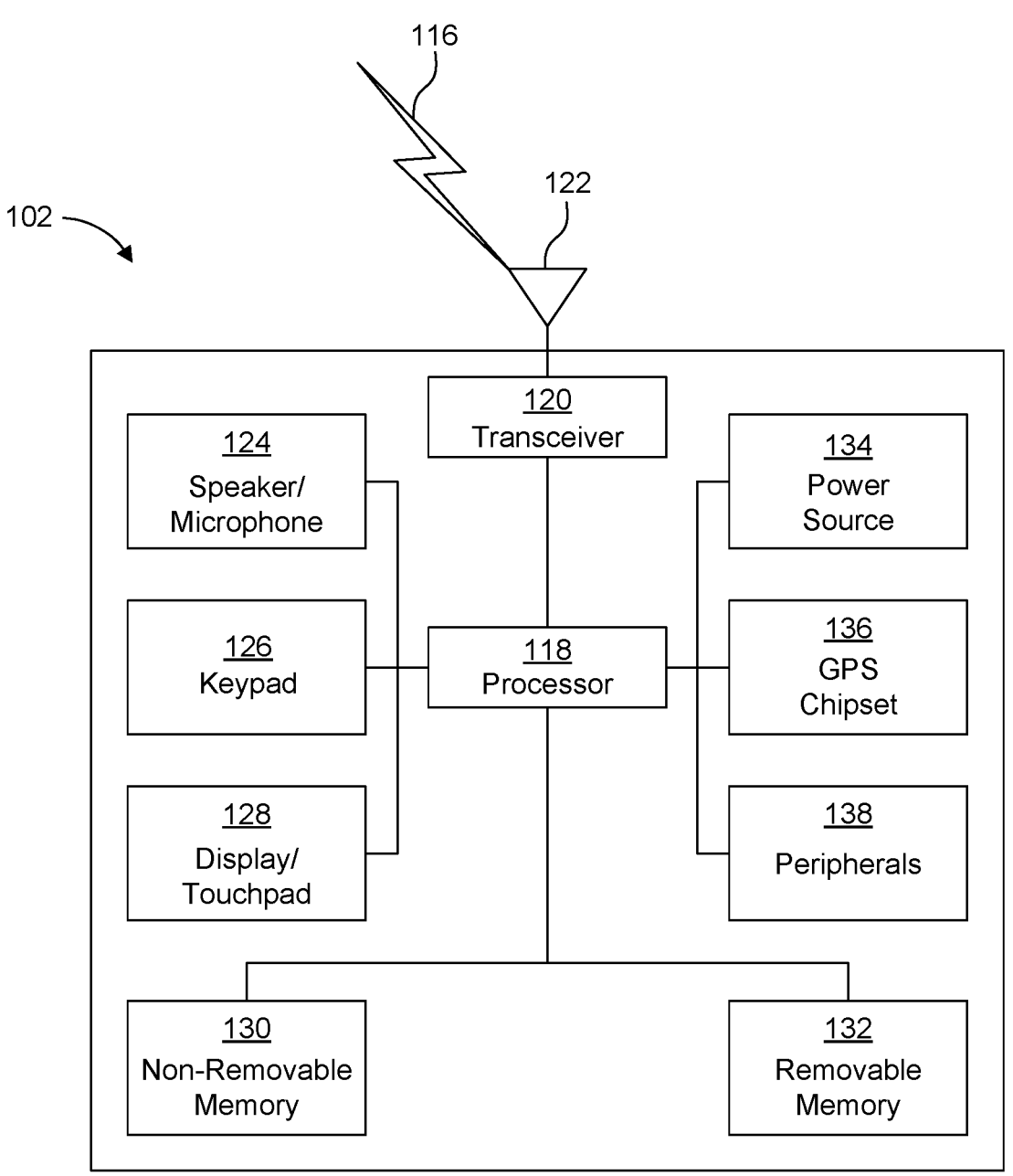
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
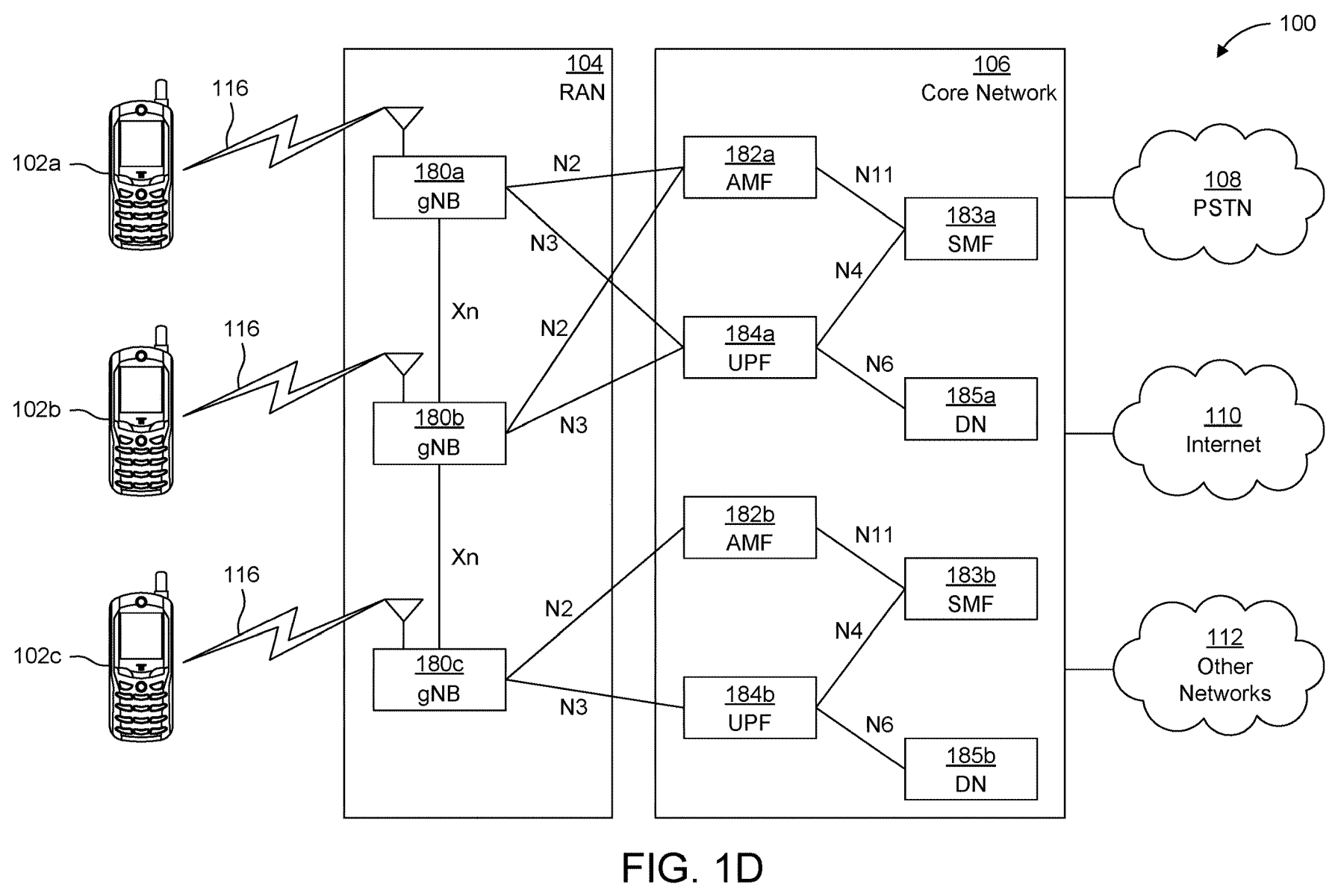

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a,184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handing of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Following is a description of how a WTRU (also referred to as a UE) operates over a Primary Mobile Network (PMN), according to an embodiment.

A WTRU capable of DualSteer capability, where the WTRU:

receives, from a first Mobile Network, a first set of Secondary Mobile Network (SMN) information related to a second Mobile Network;

selects the first Mobile Network based on the first set of SMN information;

registers with the first Mobile Network;

is triggered to start a Multi-Access-Protocol-Data-Unit (MA-PDU) session based on QoS requirements of the Service Data Flows (SDFs) and on the first set of SMN information; and sends a PDU session establishment request, including the DualSteer capability of the WTRU, the WTRU's preferred MA-PDU session type, the access types that the WTRU supports for a 2$^{nd}$ 3GPP access leg, and the access types that the WTRU "prefers" for the 2$^{nd}$ 3GPP access leg, for example based on factors such as the QoS requirements of the SDFs.

Following is a description of registration handling at an Access and Mobility management Function (AMF) of a Primary Mobile Network (PMN), according to an embodiment.

An AMF having DualSteer capability:

provides to a RAN and/or a WTRU, a first set of SMN information related to a second Mobile Network, and an indication that the AMF supports DualSteer functionality;

receives a registration request from a WTRU, with an indication that the WTRU supports DualSteer functionality; and sends a registration response to the WTRU, where the response indicates whether the AMF accepts or rejects the registration request from the WTRU.

The following is a description of Protocol Data Unit (PDU) Session Establishment handling at a Session Management Function (SMF) a of Primary Mobile Network (PMN), according to an embodiment.

An SMF capable of DualSteer receives a PDU session establishment request from a WTRU, which includes one or more of the following: an indication that the request is for a MA-PDU session, DualSteer capability, preferred MA-PDU session type, supported access types for a 2nd 3GPP access leg, and preferred access types for the 2nd 3GPP access leg;

checks the requested MA-PDU session type, and, if the requested MA-PDU session type is "one leg over 3GPP and one leg over non-3GPP" and the WTRU has registered over both accesses, then the SMF establishes the user-plane resources over the 3GPP access and over the non-3GPP access; and checks the requested MA-PDU session type, and, if the requested MA-PDU session type is "both legs over 3GPP" and the WTRU has registered only over one 3GPP access leg, then the SMF establishes the user-plane resources over that 3GPP access leg, and sends a PDU session establishment response to the WTRU over this 3GPP access leg. The response may include one or more preferred Secondary Mobile Networks (SMNs) and/or one or more preferred access types, and/or one or more SMN/access type combinations.

The following is a description of how a WTRU operates over a Secondary Mobile Network (SMN), according to an embodiment.

A WTRU capable of DualSteer, which is registered to a first Mobile Network:

receives, from the first Mobile Network, a first set of SMN information related to a second Mobile Network;

receives, from the first Mobile Network, a PDU session establishment response, including 1) an indication that the PDU session should be an MA-PDU session with DualSteer functionality, and 2) a second set of SMN information related to a second Mobile Network (the second Mobile Network may be the same as, but is typically different from, the previously mentioned second Mobile Network with which the first set of SMN information is related);

selects the second Mobile Network based on the first set of SMN information, the second set of SMN information, and a set of SMN selection rules;

registers with the selected second Mobile Network, including in the registration request 1) an indication that the registration is for a SMN and 2) an identity of the first Mobile Network;

deregisters from the selected Second Mobile Network based on: connectivity, location, and/or finding a better SMN/access technology combination; and switches a $2^{nd}$ 3GPP access leg from a source (e.g., the previously selected) SMN to a target (e.g., new selected) SMN.

Following is a description of registration handling at an Access Mobility Management Function (AMF) of a Secondary Mobile Network, according to an embodiment.

An AMF capable of DualSteer capability:

receives a registration request from a WTRU, the registration request including indication that the WTRU is requesting to use the Mobile Network for a $2^{nd}$ 3GPP access leg, and an indication of a Primary Mobile Network of the WTRU;

uses indications received in the registration request to help determine whether to accept or reject the registration request; and sends a registration response to the WTRU, the response indicating whether the registration is accepted or rejected. If rejected, the AMF provides a cause (of the rejection) value and an indication of how long the Mobile Network should not be used as a Secondary Mobile Network.

the registration request further includes the identity of a source SMN/access technology combination and a list of PDU session IDs that are being requested to be transferred to the Second Mobile Network.

In current releases of some smartphone technology, WTRUs provide both their Session Management (SM) and Mobility Management (MM) capability to the core network. A WTRU sends the WTRU MM Core Network Capability information to the Access and Mobility Management Function (AMF) during the Initial Registration procedure and Mobility Registration Update procedure, within a Non-Access Stratum (NAS) message. Similarly, a WTRU includes its 5GSM Core Network Capability in PDU Session Establishment/Modification Requests. This latter message includes the WTRU's Access Traffic Steering, Switching and Splitting (ATSSS) capabilities.

WTRUs may be required to perform registration to a network if they need to access services requiring registration. In order to perform this registration, the WTRU performs a series of steps according to an embodiment:

Public Land Mobile Network (PLMN) selection or Standalone Non-Public Network (SNPN) selection—procedure by which a WTRU selects a mobile network. This network may be a public network or a non-public network. WTRUs are configured with a priority for each mobile network. For example, a Home PLMN may be configured with the highest priority. The WTRU follows rules to determine how to select from the available networks at a given location, and to determine when to look for higher-priority networks. For example, if a WTRU is in a Visited PLMN (e.g., WTRU is roaming), the WTRU is regularly looking for its Home PLMN, which is a higher priority mobile network.

Cell selection—procedure by which the WTRU initially selects the best cell on the selected network, and subsequently "camps" on the cell.

Cell reselection—procedure by which the WTRU continually evaluates the cell quality and if necessary, decides to 'camp' on a different cell.

Registration—procedure to inform a network about the WTRU presence and provide some coarse location information.

WTRUs can support Carrier Aggregation (CA); CA typically is provided over a single 3GPP access (for example New Radio (NR) or Long Term Evolution (LTE)), but allows the WTRU to receive over two or more cells. The cells are each on different frequency carriers. The use of the two cells is managed entirely in the Radio Access Networks (RANs).

WTRUs also can support Dual Connectivity (DC); DC allows a WTRU to receive/transmit over two (or more) 3GPP accesses (or 3GPP access legs). The accesses may be NR (gNB) or LTE (eNB). In 5G, the initial deployments had one leg over LTE and a second leg over NR. However, current deployments of DC also support two legs over NR. In this case, the two legs are on different bands (e.g., FR1 and FR2). In order to employ DC, a WTRU typically would need the Radio Frequency (RF) front end to support both accesses. In dual connectivity, one leg is the master leg (and part of a Master Cell Group (MCG)), and the other leg is the secondary leg (and part of a Secondary Cell Group (SCG)).

WTRUs also can support communication over satellite links. This allows a WTRU to receive/transmit over transparent satellite/repeater links (with satellite/repeater in different orbits: GEO, MEO, LEO, HAPS). A WTRU may require the RF front end to communicate over the transparent satellite/repeater.

WTRUs can support various combinations of dual connectivity and carrier aggregation. A WTRU can have dual connectivity over two 3GPP access legs, and each of the access legs can use carrier aggregation. The set of cells on one access leg is referred to as a cell group. Furthermore, a WTRU can have dual connectivity with one leg or both legs over transparent satellite/repeater links. For example, the following scenarios are supported:

Leg1: NR Leg2: GEO satellite

Leg1: NR Leg2: LEO/MEO satellite

Leg1: GE0 Leg2: LEO/MEO satellite

Some technologies already allow WTRUs with Dual Connectivity (DC) to operate over two 3GPP access legs. But DC does have some limitations. In DC, a WTRU is configured with how a data radio bearer (DRB) is mapped over the two access legs MCG bearer data bearer goes over master leg SCG bearer: data bearer goes over the secondary leg Split bearer: data bearer is split between master leg and secondary leg. All processing is performed above Radio Link Control (RLC) layer in master leg and all processing is performed below (Packet Data Convergence Layer) PDCP layer in secondary leg.

In each case, the over-the-air transmissions of the radio bearers are over a single access leg.

Figure 2:
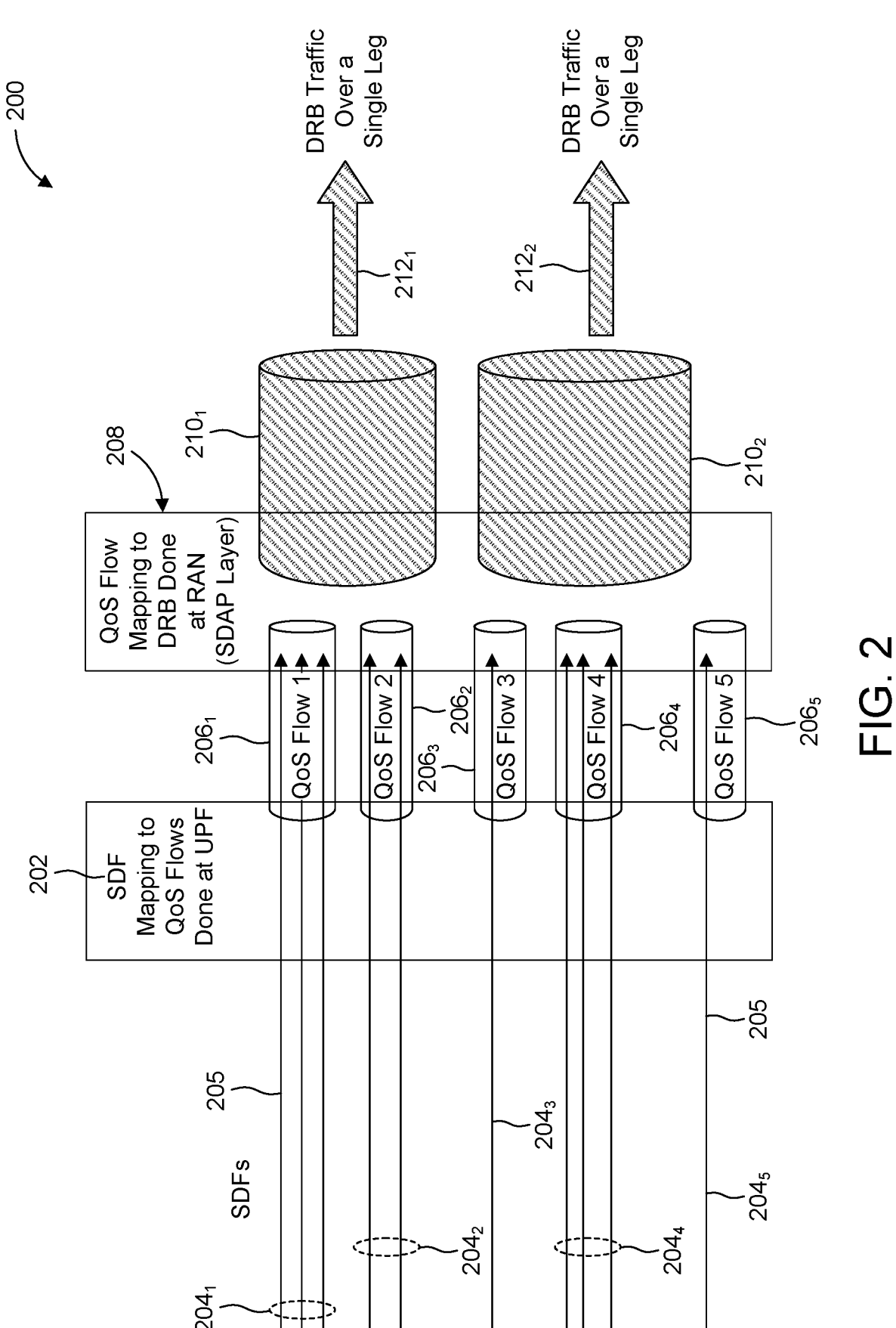
FIG. 2 is a diagram of service data flows over dual connectivity, according to an embodiment.

FIG. 2 is a diagram 200 that shows how downlink (DL) Service Data Flows (SDFs) travel over the 5G network and are transmitted over a data radio bearers (DRBs).

At an ingress point (User Plane Function (UPF)) 202, groups $204_1$-$204_5$ of SDFs 205 (each group may include a single, or multiple, SDFs) are mapped to QoS Flows $206_1$-$206^5$. Traffic over these QoS Flows $206_1$-$206_5$ arrive at the SDAP layer 208 of the RAN layers, where the traffic is mapped to DRBs DRB1 $210_1$ and DRB2 $210_2$, and transmitted over the radio interface over a single radio-access leg $212_1$ and $212_2$. It is noted that for some technologies, an SDF is mapped to a single QoS flow 206, a QoS flow is mapped to a single DRB 210, and a DRB is transmitted over the air over a single 3GPP radio-access leg 212. As a result, different SDFs 205 may rely on Dual Connectivity (DC), and may be transmitted over different 3GPP accesses, but a single SDF flow 205 typically may not be split/switched/steered/duplicated over 2 different 3GPP accesses.

Effectively, traffic from an SDF 205 can go through only one 3GPP access leg 212. The choice of access leg may be changed through RAN layer reconfiguration, but this can be a very slow process.

Engineers have begun to study use cases and requirements where an SDF 205 can be split/switched/steered/duplicated over two (or more) 3GPP radio-access legs 212. Objectives of this study include:

Study additional use cases and potential service requirements that could benefit from 5GS support of upper layer steering, split and switching of WTRU's traffic (e.g., pertaining to the same data session, pertaining to the same service data flow (SDF), pertaining to the same application flow) across two (or more) 3GPP access links, assuming only a single subscription of a WTRU to a Public Land Mobile Network (PLMN), including the following scenarios:

Single PLMN, PLMN plus (standalone) Non-Public Network (NPN), two PLMNs

Same or different 3GPP Radio Access Technologies (RATs) (NR or NTN, plus one of NR, NTN or LTE)

For the PLMN plus PLMN/NPN scenarios, the two networks can be managed by the same operator or by different operators (assumed to have a business agreement among them).

A new functionality to enable steering, switching, splitting, and duplication of traffic from a single SDF 205 over two 3GPP accesses (e.g., access legs) that may be over different Mobile Networks is described, according to an embodiment.

Some technologies support ATSSS functionality, allowing a WTRU to split/steer/switch/duplicate traffic of a Service Data Flow (SDF) over both 3GPP access and non-3GPP access. 3GPP also may support Dual Connectivity (DC), which allows a WTRU to have a first SDF 205 over one 3GPP access 212 and a second SDF 205 over a second 3GPP access 212—but this does not allow splitting/steering/switching/duplication traffic of one of these SDFs. The 3GPP accesses 212 supported for Dual Connectivity (DC) may be terrestrial and non-terrestrial, and these accesses may be over PLMNs and SNPNs.

What is lacking, in at least some technologies, is the flexibility to have ATSSS functionality to split/steer/switch/duplicate traffic of a Service Data Flow (SDF) 205 over two (or more) 3GPP accesses (including non-terrestrial 3GPP and SNPN).

A feasibility study has been conducted to determine use cases that may require this additional flexibility, and to determine related new requirements resulting from these use cases (e.g., FS-DualSteer).

This new DualSteer functionality has two (or more) 3GPP accesses (e.g., for a single SDF 205)—one 3GPP access over a "first or primary mobile network (PMN)" and the other 3GPP access over a second or secondary mobile network (SMN). In each case, the mobile networks may be of different types: PLMN, SNPN, Public Network Integrated NPN (PNI-NPN), etc. The primary mobile network may be a Home mobile network or a Visited mobile network. The secondary mobile network may be different from the primary mobile network. In such a case, the behavior of a WTRU over the primary mobile network is improved to allow support for the DualSteer functionality. Furthermore, the behavior of the WTRU over the secondary mobile network is quite different from the behavior over the primary mobile network, and these behaviors typically are defined. For example, a WTRU typically needs to know how to prioritize mobile networks. Once the WTRU knows this priority, the WTRU follows new rules to start looking for secondary mobile networks and to select a secondary mobile network for DualSteer operation. Once a WTRU has found and selected a secondary mobile network, the WTRU operates over this secondary mobile network. As a result, the WTRU "knows" how to register and to deregister from the secondary mobile network (SMN), and also "knows" how to handle a switch in secondary mobile networks (e.g., from a source secondary mobile network to a target secondary mobile network).

Common terminology used herein is as follows.

The term Mobile Network (MN) is used to refer to a mobile network of any type, including Public Land Mobile Network (PLMN), Non-Public Network (NPN), Standalone NPN (SNPN), and/or Public Network Integrated NPN (PNI-NPN).

The term Second MN or Secondary MN (SMN) is used to refer to the mobile network used to provide the second (or other) 3GPP access.

The term First MN or Primary MN (PMN) is used to refer to a home mobile network or visited mobile network. It is the mobile network over which a WTRU first registers.

The term DualSteer functionality is used to mean functionality that allows a WTRU and a User Plane Function (UPF) to apply a steering mode to split, steer, switch, or duplicate traffic over two (or more) 3GPP access legs. The following steering modes may be supported: Active-Standby, Smallest-Delay, Load-Balancing, Priority-based, and/or Duplication.

The terms 3GPP access, 3GPP access leg, and 3GPP access path are used interchangeably. A 3GPP access leg may be over a terrestrial access (for example NR and/or LTE) or over a non-terrestrial access (for example GEO satellite, MEO satellite, LEO satellite, and/or HAPS).

The term PLMN selection is used to refer to a legacy PLMN selection procedure, for example as defined in prior technology releases.

The term Primary MN selection is used to refer to a MN selection procedure that is tailored to find MNs that support DualSteer functionality.

The term Secondary MN selection is used to refer to a MN selection procedure that is tailored to find Secondary MNs.

The term SMN information is used to refer to information related to SMNs that: 1) may assist the WTRU in making a SMN selection, 2) may assist a WTRU in making a primary MN selection, 3) may assist a WTRU in determining when to perform a cell-reselection procedure for the SMN.

And the term PDU Session Assistance Information is used to refer to information provided by the WTRU (for example in PDU Session Establishment request or PDU Session Modification request) to the network to help the network with establishing a MA-PDU session.

To enable DualSteer functionality, embodiments are disclosed in the following areas:

Architecture to enable DualSteer functionality across two different Mobile Networks Procedure for a WTRU to select and register to a primary Mobile Network Modified MA-PDU session establishment procedure— new triggers, new content to message, new actions related to reception of a response Procedure for a WTRU to select and register to a Secondary Mobile Network (SMN)

WTRU behavior/actions when operating over a Secondary Mobile Network (SMN)

Applicable benefits that can be common to the disclosed embodiments include enabling DualSteer functionality over a Secondary Mobile Network (SMN), which can allow a WTRU and a UPF to take advantage of the dual-radio capabilities of many devices to efficiently split/steer/switch/duplicate traffic from a single session. An embodiment attempts to improve how a WTRU selects a Secondary Mobile Network and when the WTRU selects the Secondary Mobile Network (SMN).

In the following description of DualSteer Functionality according to an embodiment, it is initially assumed that a WTRU is not registered on any MN. To enable the DualSteer functionality for a specific SDF, a number of communications, or steps, occur between a WTRU and one or more MNs to allow the set-up and maintenance of the Multi-Access Protocol Data Unit (MA-PDU) session with two (or more) 3GPP access legs (for purposes of example, the communications/steps are described in conjunction with set-up and maintenance of an MA-PDU session with two 3GPP access legs). These communications/steps are shown in, and described below in conjunction with, FIG. 3 and FIG. 4, according to an embodiment.

Figure 3:
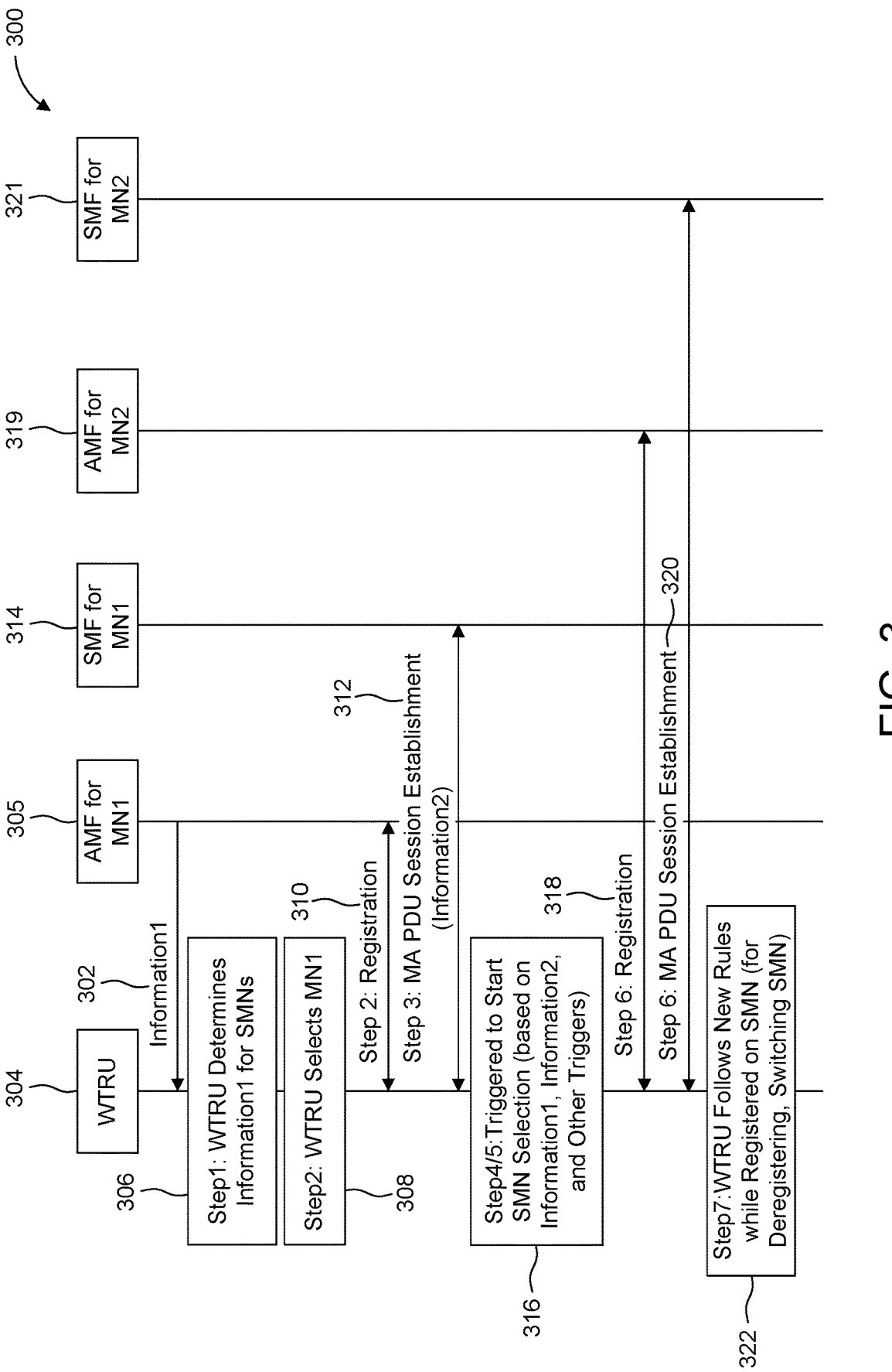
FIG. 3 is a diagram of steps to enable DualSteer Functionality for an MA PDU session, according to an embodiment.

FIG. 3 is a diagram 300 of communications/steps to enable DualSteer Functionality for an MA-PDU session, according to an embodiment.

Figure 4:
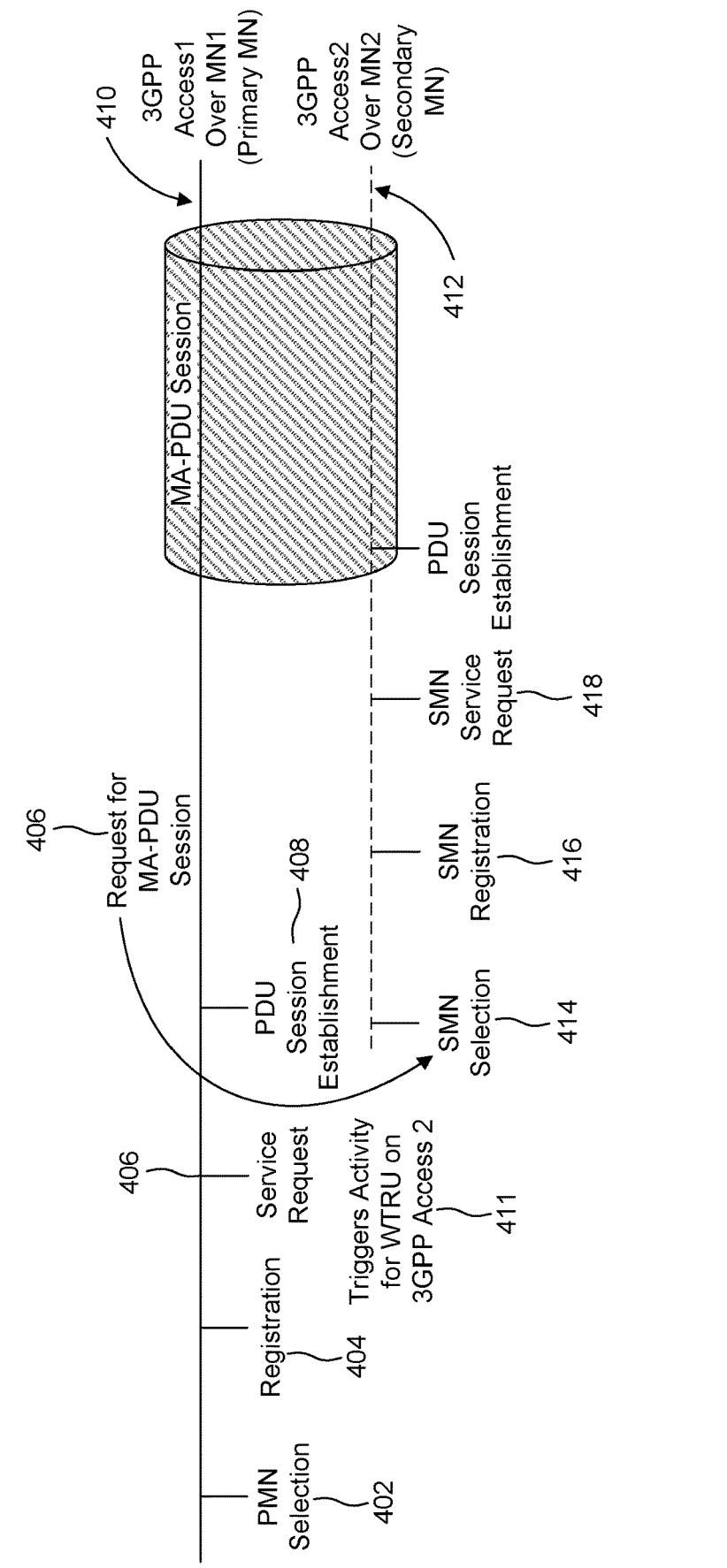
FIG. 4 is timing diagram of an MA PDU session set-up with DualSteer Functionality, according to an embodiment.

FIG. 4 is a diagram 400 of an MA-PDU session set-up with DualSteer Functionality, according to an embodiment.

Referring to FIG. 3, at 302, a WTRU 304 receives, from an AMF 305 for a network MN1, a first set (information1) of one or more SMN information entries, and at 306 determines, from the first set of one or more SMN information entries (information1), a list of SMNs as described herein. This information (information1) may include and/or indicate information such as SMN ID, priority of an SMN, access technology to be used for an SMN, etc. Some of this information may be configured in the WTRU 304 while other of this information may be provided by the network. In the latter case, the SMN information may be provided over/with RAN system information, or via a prior registration of the WTRU 304 to the mobile network (in this case, it is assumed that the WTRU stores this previously received SMN information).

At 308, the WTRU 304 selects, and at 310 the WTRU registers with, a MN1 (also referred to as a Primary MN). This selection and registration can be modified (and, in this example, is modified) to enable DualSteer functionality.

At 312, the WTRU 304 determines that it needs to start a MA-PDU session, and, therefore, it sends an MA-PDU session establishment request over 3GPP access 1 (MN1) to a Session Management Function (SMF) 314 for MN1. The request message is enhanced to allow setting up the session over two 3GPP accesses (e.g., two 3GPP access legs).

Still at 312 and at 316, the WTRU 304 receives an MA-PDU session establishment response, which includes a second set of one or more SMN information entries (information2), as described herein, which, for example, includes and/or indicates a list of SMNs. Upon receiving the MA-PDU session establishment response, the WTRU 304 triggers activity related to the $2^{nd}$ 3GPP access leg and uses the received SMN information (information1 and/or information2) to assist the WTRU in selecting the SMN/access-technology combination. The information (information1 and/or information2) may include information such as SMN ID, service-area restrictions, time restrictions, edge-application-server capability, etc.

Still at 316, the WTRU 304 performs SMN selection based on information1, based on information2, and/or based on one or more other triggers such as QoS, anticipated data rate, etc.

At 318, the WTRU 304 registers with the selected SMN via an AMF 319, and, at 320, completes the MA-PDU-session establishment via an SMF 321 for the selected SMN.

And at 322, the WTRU 304 follows SMN rules to determine when to deregister from the SMN on which the WTRU is currently registered and/or otherwise when to switch the established MA-PDU session to a different SMN.

Referring to FIG. 4, the procedure of FIG. 3 (or a procedure similar thereto) is described in conjunction with the diagram 400, according to an embodiment.

At 402, the WTRU 304 (FIG. 3) selects a PMN, for example, based on whether the PMN is supports DualSteer Functionality.

At 404, the WTRU 304 registers to the selected PMN.

At 406, the WTRU 304 makes a service request to the PMN with which the WTRU is registered, the service request including a request to establish an MA-PDU session.

At 408, the WTRU 304 receives, from the PMN, an MA-PDU session establishment response, which includes one or more SMN information entries including and/or indicating a list of SMNs, and the PMN establishes a portion of an MA-PDU session related to a $1^{st}$ 3GPP access leg 410.

Upon receiving the MA-PDU session establishment response from the PMN, at 411 the WTRU 304 triggers activity related to a $2^{nd}$ 3GPP access leg 412 and uses the received SMN information to assist the WTRU in selecting the SMN for the $2^{nd}$ 3GPP access leg. The information may include and/or indicate, SMN ID, service-area restrictions, time restrictions, edge-application-server capability, etc.

At 414, the WTRU 304 selects an SMN based on the received SMN information and/or on one or more other triggers such as QoS, anticipated data rate, etc.

At 416, the WTRU 304 registers with the selected SMN.

At 418 the WTRU 304 requests service with the SMN to which the WTRU is registered, the service request including requesting establishment of the $2^{nd}$ 3GPP access leg 412 of the MA-PDU.

And at 420, the $2^{nd}$ 3GPP access leg 412 is established in the SMN.

Thereafter, the WTRU 304 transmits and receives data over one or both of the $1^{st}$ and $2^{nd}$ 3GPP access legs 410 and 412. For example, the WTRU 304, PMN, and SMN can cooperate to transfer data corresponding to SDFs, even corresponding to a single SDF, over one or both of the 3GPP access legs 410 and 412. And, where data is transferred over both of the $1^{st}$ and $2^{nd}$ 3GPP access legs 410 and 412, the WTRU 304, PMN, and SMN can cooperate to determine what portion of the data is transferred over each of the $1^{st}$ and $2^{nd}$ access legs.

Described in the following is an architecture to support DualSteer Functionality with two 3GPP access legs (Access 1 and Access 2) over different MNs (a Primary Mobile Network (PMN) and a Secondary Mobile Network (SMN), according to an embodiment.

Figure 5:
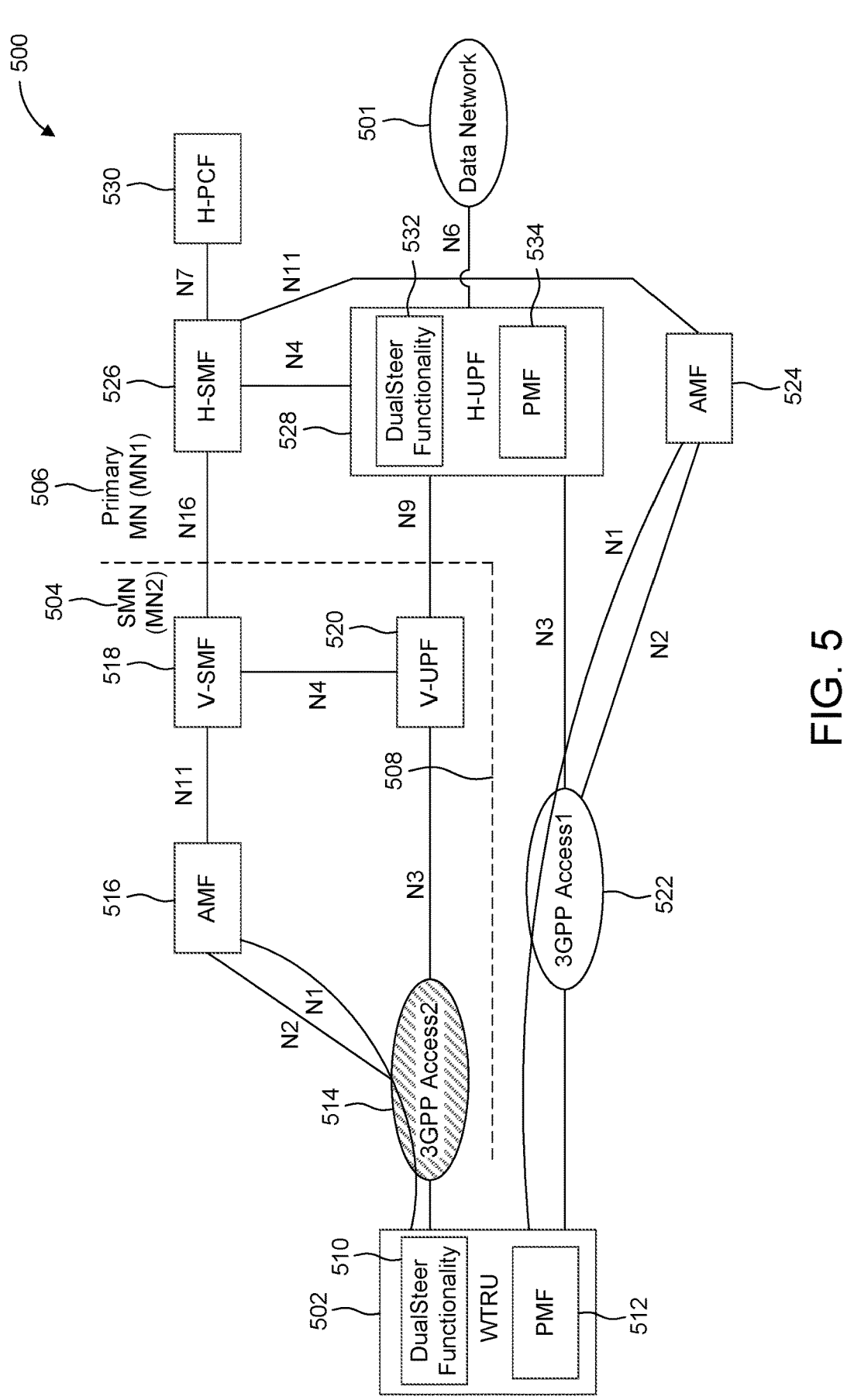
FIG. 5 is a diagram of an architecture of a DualSteer session and of DualSteer operation, according to an embodiment.

FIG. 5 is a diagram of an architecture of a wireless communications system 500 that supports DualSteer Functionality, according to an embodiment.

The system 500 is coupled to a data network 501 and includes a WTRU 502, a Secondary Mobile Network (SMN) 504, and a Primary Mobile Network (PMN) 506, where the SMN and PMN are conceptually separated by a dashed line 508. Functions and/or operations described may be implemented on circuitry configured to perform such functions and/or operations even if not expressly stated. And the interfaces N may be any type of suitable interfaces such as over-the-air interfaces.

The WTRU 502 includes circuitry 510 configured to support and to implement DualSteer Functionality and circuitry 512 configured to support and to implement Performance Measurement Function (PMF). For example, the circuitry 510 and 512 can be part of a same microprocessor or microcontroller, or can be part of two or more microprocessors or microcontrollers.

The SMN 504 is configured to implement a $2^{nd}$ 3GPP Access Leg (Access 2) 514 and includes Access and Mobility management Function (AMF) 516, Session Management Function (V-SMF) 518, and User Plane Function (V-UPF) 520. An interface N1 couples the WTRU 502 and the AMF 516 via the $2^{nd}$ 3GPP Access Leg 514, and an interface N2 couples the $2^{nd}$ Access Leg to the AMF. An interface N2 couples the $2^{nd}$ 3GPP Access Leg 514 to the AMF 516, and an interface N3 couples the $2^{nd}$ Access Leg to the V-UPF 520.

The PMN 506 is configured to implement a $1^{st}$ 3GPP Access Leg (Access 1) 522 and includes Access and Mobility management Function (AMF) 524, Session Management Function (H-SMF) 526, User Plane Function (H-UPF) 528, and a Policy Control Function (H-PCF) 530. The H-UPF 528 includes circuitry 532 configured to support and to implement DualSteer Functionality and circuitry 534 configured to support and to implement Performance Measurement Function (PMF). For example, the circuitry 532 and 534 can be part of a same microprocessor or microcontroller, or can be part of two or more microprocessors or microcontrollers. An interface N1 couples the WTRU 502 and the AMF 524 via the $1^{st}$ 3GPP Access Leg 522, an interface N2 couples the $1^{st}$ Access Leg to the AMF 524, an interface N3 couples the $1^{st}$ Access Leg to the H-UPF 528, an interface N4 couples the H-UPF 528 to the H-SMF 526, an interface N6 couples the H-UPF 528 to the data network 501, an interface N7 couples the H-SMF to the H-PCF 530, an interface N9 couples the V-UPF 520 to the H-UPF, an interface N11 couples the AMF 524 to the H-SMF, and an interface N16 couples the V-SMF 518 to the H-SMF.

Still referring to FIG. 5, to support DualSteer functionality where a first 3GPP accesses is over MN1 and a second 3GPP access is over MN2, an embodiment relies on a home-routed roaming architecture as described above in conjunction with FIG. 5, with MN1 behaving as the HPLMN and MN2 behaving as the VPLMN. The DualSteer Functionality 510 is located in the WTRU 502 and in the H-UPF 528 of the Primary MN 506. The WTRU 502 maintains two registrations: one over the primary MN 506 and a second over the SMN 504. User plane traffic is forwarded from the SMN 504 to the Primary MN 506 over an N9 interface—similarly to how user-plane traffic is forwarded to a home network in a home-routed roaming case.

Relative to providing SMN information to the WTRU 502, the WTRU receives SMN information for a list of SMNs. For each SMN, the SMN information may include one or more of the following, according to an embodiment SMN ID: identifier for the SMN. For example, this could be a Fully Qualified Domain Name (FQDN), the 5 or 6 digit combination of a Mobile Country Code (MCC) and a Mobile Network Code (MNC) assigned to a PLMN, or the combination of PLMN ID and NID assigned to an SNPN.

Available network slices. These may be identified by a Single Network Slice Selection Assistance Information (S-NSSAI).

Alternatively available network slice types. These may be identified by Slice/Service Type (SST).

Priority associated with the SMN (for example, a priority for the WTRU 502 to use the SMN compared to other SMNs).

Type of SMN: PLMN, SNPN.

Access type supported by the SMN: This may be an indication if the SMN supports one or a combination of the following: NR, LTE, and/or satellite. For satellite access, the information may further include details as to the type of satellite: LEO, MEO, GEO.

Service-area restrictions: location where the service provided by the SMN is available. For example, the restrictions may be defined based on: geofencing, one or more tracking areas, one or more base stations, one or more cells of a base station.

Time restrictions: times at which the service provided by the SMN is available. The service for the SMN may be available during specific times (for example rush hour). Alternatively, the service may be available based on an expected satellite coverage (for example, a satellite may provide coverage for 1 hour every 2 days at a specific location).

List of edge application servers: the SMN may host multiple edge application servers or have access to edge data networks that host the edge application servers. These may be identified by FQDNs or URIs.

List of FQDNs and/or URIs, identifying available domains and/or services.

List of DNs (including LADNs) served by the SMN.

QoS performance: the SMN information may provide an indication of the QoS performance of a specific SMN/ access technology combination. The QoS performance may be in terms of reliability of the SMN/access technology combination. For example, this may be a measure of the Packet loss rate over the SMN/access technology. Alternatively, the QoS performance may be in terms of latency of the SMN/access technology combination. For example, this may be a measure of the latency between the WTRU and UPF over the SMN/access technology.

Traffic identification: the SMN information may provide an indication of the type of traffic that is to be sent over the SMN, or SMN/access technology combination. The type of traffic may be identified by one or more SDFs, one or more types of SDFs, and/or one or more 5QI values.

Note that if some of the SMN information is common across multiple SMNs, then the list may contain an identifier to identify the set of multiple SMNs. For example, a FQDN template such as *.operator1.com could refer to multiple SMNs with a matching SMN ID. There may also be a wildcard used to denote "any SMN that supports DualSteer."

Figure 6:
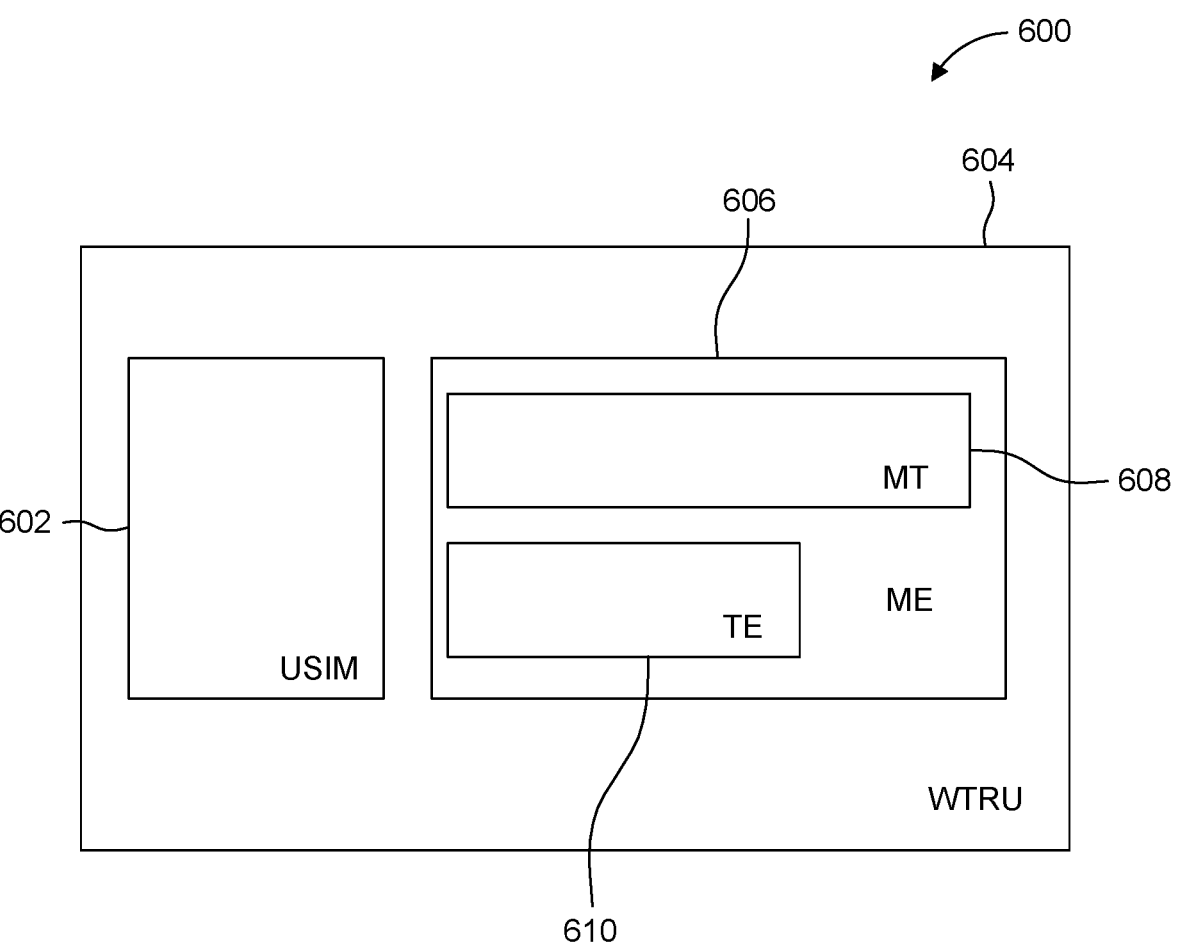
FIG. 6 is a diagram of how SMN information is stored in EFs, according to an embodiment.

FIG. 6 is a diagram 600 of a WTRU 604 and of how SMN information is stored on the WTRU in Elementary Files (EFs), according to an embodiment. The WTRU 604 includes a Universal Subscriber Identity Module (USIM) 602, a Mobile Equipment (ME) 606, a Mobile Termination (MT) circuit 608, and a Terminal Equipment (TE) circuit 610.

The SMN information may be received by one or a combination of the following methods, according to an embodiment.

In a first method, the SMN information may be stored in Elementary Files (EFs) maintained in the Universal Subscriber Identity Module (USIM) 602 and made available to a WTRU 604. Alternatively, the Elementary Files (EFs) may be maintained in the Mobile Equipment (ME) 606 and made available to the WTRU 604.

In a second method, the SMN information may be provided through Non-Access Stratum (NAS) signaling via another MN (for example the primary MN). The SMN information may be provided through the Registration Accept message, a Service Accept message, a PDU Session establishment response message, and/or a PDU session modification response message and/or a WTRU Configuration Update Command. Alternatively, the SMN information may be obtained from the other MN via a new NAS signaling exchange (e.g., DualSteer Request/Response). As another alternative, the SMN information may be obtained as part of the policy information provided to the WTRU 604 through a policy container.

More generally, the SMN information may be split, with some SMN information provided over the first method and other SMN information provided over the second method.

Relative to a WTRU receiving DualSteer assistance information for one or more SMNs from a Primary MN, a WTRU 604 may receive DualSteer assistance information from the primary MN to assist in DualSteer Functionality.

A first example of receiving DualSteer assistance information from the primary MN may be receiving an indication whether the MN supports DualSteer Functionality.

A second example of receiving DualSteer assistance information from the primary MN may be receiving an indication of the preferred list of SMNs.

A third example of receiving DualSteer assistance information from the primary MN may be receiving SMN information.

Relative to modified functionality to allow a WTRU 604 to select and to register with a Primary MN in support of DualSteer Operation, the WTRU performs MN selection to camp on a cell of a Primary MN. In the MN selection process, the WTRU 604 considers only an MN as an MN selection candidate if the MN supports the DualSteer Functionality. Alternatively in the MN selection process, the WTRU 604 considers only an MN as an MN selection candidate if (the MN supports the DualSteer Functionality) AND (the MNs on a preferred list of SMNs are allowed). For example, the WTRU 604 may determine that a PLMN is allowed, if the PLMN is not on the list of "forbidden PLMNs", nor on the list of "forbidden PLMNs for GPRS service", nor on the list of "PLMNs not allowed to operate at the present WTRU location", nor on the list of "MNs not allowed to operate as Secondary PLMN". As another alternative in the MN selection process, the WTRU 604 considers an MN as an MN selection candidate if (the MN supports the DualSteer Functionality) AND (the MNs on a preferred list of SMNs are allowed) AND (the access technology of the MNs on the preferred list of SMNs is supported by the WTRU). For example, the WTRU 604 may support NR and LTE only, and, as a result, will not consider any SMN in the preferred list of SMNs that is accessible only through non-terrestrial access.

If a WTRU is DualSteer capable, in a first option, the WTRU may always follow the procedures for Primary MN selection. In a second option, the WTRU may decide to follow the Primary MN selection procedures only when DualSteer Functionality is needed for a service data flow (SDF). For example, upon power on, the WTRU may follow a legacy MN selection procedure. In the registration accept message, the WTRU may be provided with DualSteer assistance information. If, at some later time, the WTRU determines that it needs to establish a MA-PDU session with DualSteer Functionality, it first evaluates the DualSteer assistance information to determine whether the Registered MN supports DualSteer Functionality and if so, whether the WTRU may make use of any MN on the preferred list of SMNs. For example, a WTRU may not be able to use any MN if the MNs on the preferred list of SMNs are on the WTRU's list of "forbidden PLMNs", or the PLMNs on the preferred list of SMNs use an access technology that is not supported by the WTRU. In such a case, the WTRU may be triggered to perform a new Primary MN selection.

In both the first and second options, once the WTRU has selected a Primary MN, it sends an initial registration request to the AMF of the Primary MN. Subsequently, the WTRU updates its registration with the primary mobile network:

- periodically, to remain reachable (Periodic Registration Update); or
- upon mobility (Mobility Registration Update); or
- to update its capabilities or re-negotiate protocol parameters (Mobility Registration Update).

In all registration requests, a WTRU may include an indication that the WTRU is capable of DualSteer Functionality.

Relative to new triggers for a WTRU to initiate, or to establish, an MA-PDU session with DualSteer Functionality, the WTRU may determine that a certain service data flow (SDF) requires DualSteer Functionality. Basing this determination on WTRU implementation is not efficient, as there is a penalty to the WTRU and a waste in radio resources, if DualSteer is enabled when not needed. For the WTRU, DualSteer operation typically would require the WTRU to camp on two 3GPP cells, and thereby result in extra power consumption. Similarly, having the WTRU using DualSteer Functionality can result in the WTRU using radio resources on both 3GPP access legs. This use can reduce the radio resources available to other WTRUs. As a result, it is proposed, in an embodiment, that the WTRU only initiate a MA-PDU session (over its registered MN) with DualSteer Functionality if one or more of the following trigger conditions are met:

- The WTRU is using 3GPP accces1 and is registered to a MN that supports DualSteer Functionality. That is, the registered MN supports DualSteer Functionality
- The WRTU is registered to a registered MN, and the WTRU may make use of a MN on the preferred list of SMNs associated with the registered MN.
- The QoS requirements for the SDF will not be met over the 3GPP access1. In one alternative, the WTRU may base this decision (whether to initiate an MA-PDU session over its registered MN with DualSteer Functionality) on information broadcast by the cells of 3GPP access1. For example, this may include an indication of the current load in the cell, the current number of WTRUs being served in the cell, the percentage of radio resources used in the cell, the percentage of radio resources free in the cell, etc. In a second alternative, the WTRU may base this decision (whether to initiate an MA-PDU session over its registered MN with DualSteer Functionality) on measurements made by the WTRU. For example, this may include the received signal quality in the cell, the statistical measurements related to Hybrid Automatic Repeat Request (HARQ), etc. In a third alternative, the WTRU may base this decision (whether to initiate an MA-PDU session over its registered MN with DualSteer Functionality) on conditions known to the WTRU. For example, this may include the location of the WTRU, knowledge that the WTRU is at a cell edge, knowledge that an edge application server is available over a SMN, etc.

The availability of the $2^{nd}$ 3GPP access. This may be based on the service-area restrictions included in the SMN information. Alternatively, this may be based on the time restrictions included in the SMN information. For example, if a WTRU "knows" that DualSteer Functionality will be over a non-terrestrial access, the WTRU may only request an MA-PDU session when this non-terrestrial access is available.

The WTRU receives a device trigger message for application(s) on the WTRU. The payload included in a Device Trigger Request message contains information on which application on the WTRU is expected to trigger the MA-PDU Session establishment request. The device trigger may also include an indication that the downlink traffic associated with the triggered application requires DualSteer Functionality.

As part of the MA-PDU Session Establishment request, a WTRU may include PDU Session Assistance Information, as described herein. For example, PDU Session Assistance Information may include one or more of the following:

DualSteer capability, as well as indication of steering functionalities supported for DualSteer Functionality and the steering modes supported for each steering functionality;

Preferred MA-PDU session type: different MA-PDU session types may be supported: option1: one leg over 3GPP access and one leg over non-3GPP access; option 2: both legs over 3GPP access;

Supported access types for the $2^{nd}$ 3GPP access leg;

Preferred access type for the $2^{nd}$ 3GPP access leg;

Requirements for the $2^{nd}$ 3GPP access leg;

PLMNs that are on the WTRU's list of "forbidden PLMNs", or the WTRU's list of "forbidden PLMNs for GPRS service", or the WTRU's list of "PLMNs not allowed to operate at the present WTRU location", or the WTRU's list of "MNs not allowed to operate as a Secondary MN."

This information may be used by the Session Management Function (SMF). The SMF may use the Preferred MA-PDU session type to determine what type of MA-PDU session to set up. If the Preferred MA-PDU session type="option1: one leg over 3GPP and one leg over non-3GPP", then the SMF may establish the user plane resources on a 3GPP access and a non-3GPP access in a conventional manner. If the Preferred MA-PDU session type="option 2: both legs over 3GPP access", then the SMF may establish the user-plane resources over a 3GPP access leg, and then send a PDU session establishment response to the WTRU over this same 3GPP access leg. The response may include one or more preferred Secondary MNs, one or more preferred access types, and/or one or more SMN/access-type combinations.

In some cases, a WTRU may initiate a Single-Access-PDU (SA-PDU) session for a SDF, and then determine that a Multiple-Access-PDU (MA-PDU) session is needed, or at least is preferred. For example, this may occur when one or several of the QoS parameters exchanged between the WTRU and the network are modified, or the WTRU determines that the QoS requirements are no longer being met by the QoS flow of the SA-PDU session. In such a case, the WTRU may decide to move the SDF to an MA-PDU session using a PDU Session Modification request. The PDU Session Modification request may include PDU Session Assistance Information.

Relative to functionality for selection of a secondary MN (SMN), once the WTRU receives a PDU session establishment response (or PDU Session Modification response) to establish a MA-PDU session using DualSteer Functionality, the WTRU uses the available SMN information and starts SMN selection.

The WTRU selects the SMN from a number of SMN/access technology combinations, if available and allowable, using one or more of the following SMN selection rules.

In a first SMN selection rule, the WTRU selects an MN/access technology combination based on the priority of the MN in the preferred list of SMNs provided by the network;

In a second SMN selection rule, the WTRU selects an MN/access technology combination based on a WTRU preference for type of SMN: the WTRU may prefer to register to a SNPN rather than a PLMN (or vice versa);

In a third SMN selection rule, the WTRU selects an MN/access technology combination based on a WTRU preference of the access type: the WTRU may prefer to register over one access type. For example, the WTRU may prefer to register over a GEO satellite for the $2^{nd}$ 3GPP access;

In a fourth SMN selection rule, the WTRU selects an MN/access technology combination based on the cell strength: In legacy systems, PLMN/access technology combination is mainly selected to provide connectivity to the services offered by the mobile network. In this case, PLMN selection and cell selection, are independent procedures. As long as the quality of a cell is above a minimum threshold, the WTRU selects the PLMN based on the established priority rules. Once registered over a Home PLMN, the WTRU typically will not search for other PLMNs, even if higher priority PLMNs exist. It is expected that when DualSteer Functionality is enabled, the $2^{nd}$ 3GPP access leg will be used mostly to assist the $1^{st}$ 3GPP access leg—allowing steering/splitting/switching/duplicating an SDF over both 3GPP accesses (access legs). The end goal being to improve user-plane performance. In such cases, there may be an advantage to jointly select the SMN/access technology combination that results in WTRU camping on a cell that results in the greatest improvement in user-plane performance. For example, assume SMN1 has a higher priority than SMN2, and the best cell on SMN1 is CellA while the best cell on SMN2 is CellB. If the signal quality of CellB on SMN2 is better than the signal quality of CellA on SMN1, then there may be an improved user-plane performance if the WTRU selects SMN2 for DualSteer Functionality. In an embodiment, the WTRU determines the signal quality for multiple SMN/access technologies. The WTRU may decide to determine the signal qualities for all SMN/access technologies or only for a configured K highest-priority SMN/access technology combinations. For each SMN/access technology combination, the WTRU determines the strongest cell, and the WTRU selects the SMN/access technology combination providing the best signal quality. In another embodiment, the WTRU determine the signal qualities for multiple SMN/access technologies. The WTRU may decide to determine the signal qualities for all SMN/access technologies or only for a configured K highest-priority SMN/access technology combinations. For each SMN/access technology combination, the WTRU determines the strongest cell, and the WTRU selects the SMN/access technology combination providing the best compromise between priority and signal quality. For example, for each SMN/access technology combination, the WTRU may assign a priority value (P) and a signal strength value (S). The WTRU may then combine (e.g., mathematically such as by addition or multiplication) P and S to determine a new ranking criteria (R) and to select the SMN/access technology combination with the highest rank (R). In yet another embodiment, the WTRU is configured with a minimum signal level for a SMN/access technology combination. The WTRU determines the signal quality for each SMN/access technology combination in priority order (that is, the first SMN/access technology combination is the one with the highest priority). If the signal level for this (the highest-priority) SMN/access technology combination is above (or equal) to the configured minimum signal level, then the WTRU selects this SMN/access technology combination. In contrast, if the signal level for this (the highest-priority) SMN/access technology combination is below the configured minimum signal level, then the WTRU moves on to the next SMN/access technology combination (the SMN/access technology combination having the second highest priority).

In a fifth SMN selection rule, the WTRU selects an MN/access technology combination based on the service-area restrictions: the WTRU may use its location to determine if it is within the service-area restriction of a SMN/access technology. The WTRU may prioritize SMNs whose service-area restrictions define service areas that include the current WTRU location. That is, the WTRU is in a location where it is allowed to receive the service.

In a sixth SMN selection rule, the WTRU selects an MN/access technology combination based on the time restrictions: The WTRU may prioritize SMNs whose time restriction allows operation at the current time.

In a seventh SMN selection rule, the WTRU selects an MN/access-technology-combination-based availability of an edge application server to a SMN. The WTRU may prioritize SMNs that host, or have access to, an edge application server for the services of the SDF.

In an eighth SMN selection rule, the WTRU selects an MN/access technology combination based on connectivity to one or more Data Networks (DNs). The WTRU may prioritize SMNs that have connectivity to these DNs.

In a ninth SMN selection rule, the WTRU selects an MN/access technology combination based on supported network slices or network slice types. The WTRU may prioritize SMNs that support a specific sloe (for example identified by an S-NSSAI) or a specific slice type (for example identified by an SST).

In a tenth SMN selection rule, the WTRU selects an MN/access technology combination based on support for an application domain. That is, the operator of the SMN may have a business agreement with an application provider associated with this application domain. The WTRU may prioritize these SMNs that support a certain application domain.

In an eleventh SMN selection rule, the WTRU selects an MN/access technology combination based on meeting one or more QoS requirements for the SDF. As a first example, the SDF may have a reliability requirement. In such a case, the WTRU may select a MN/access technology combination that has a higher reliability or has a reliability above a threshold. A measure of an SMN's reliability may be determined by the MN and broadcast as part of the system information, or this may be included in the SMN information. Alternatively, an indication of SMNs' reliabilities may be pre-configured in the WTRU. That is, the WTRU may be pre-configured with relative reliability information (e.g., reliability terrestrial>reliability GEO Satellite>reliability LEO satellite>reliability HAPS) for one or more SMNs. As a second example, the SDF may have a latency requirement. In such a case, the WTRU may select an MN/access technology combination that has a lower latency or a latency below a threshold. A measure of the latency may be determined by the MN and broadcast as part of the system information or this (measure of latency) may be included in the SMN information. Alternatively, this may be pre-configured in the WTRU. That is, the WTRU may be pre-configured with relative latency information (e.g., latency GEO satellite>latency LEO satellite>latency HAPS>latency terrestrial).

In a twelfth SMN selection rule, the WTRU selects an MN/access technology combination based on policy information. The WTRU may be configured with a policy that indicates which mobile network, or access technology, or mobile network/access technology combination should be selected. The policy may be for a specific SDF, for a group of SDFs, for a specific type of SDF, for a group of types of SDF, for a specific application, for a group of applications, for a specific 5QI, or for a group of 5QI values.

It is to be understood that additional SMN selection rules may be defined, where these additional SMN selection rules rely on an SMN supporting other network capabilities (that are currently defined or will be defined in future mobile networks).

Relative to a WTRU performing registration over a selected secondary MN (SMN), once the WTRU has selected a SMN/access technology combination, the WTRU selects a suitable cell on the SMN/access technology combination and camps on the cell.

If the SMN is different from the Primary MN, the WTRU then attempts a registration to the selected SMN over the $2^{nd}$ 3GPP access (the $1^{st}$ 3GPP access having already been established with the Primary MN). The registration request may include an indication that the MN is being used as an SMN. The WTRU may also provide an indication of the Primary MN being used for the MA-PDU session. The AMF of the SMN may use this information to determine whether to accept or to reject the WTRU's request to register to the SMN. A network may want to limit the number of WTRUs that are using its network as a secondary 3GPP leg for DualSteer. For example, the network may be heavily loaded or may have limited resources, and the network may prefer to keep its resources for its own WTRUs (WTRUs that are using the network as a primary MN). In such a case, the network (AMF) may respond with a registration reject and provide a suitable cause (e.g., "SMN rejected—heavy load" or "SMN rejected—limited resources" or "SMN rejected—reserved"). The network (AMF) may additionally include a duration for how long the MN should not be used as a Secondary MN.

If the SMN is the same as the Primary MN, the WTRU also then attempts a registration to the selected SMN over the $2^{nd}$ 3GPP access (the $1^{st}$ 3GPP access having already been established with the Primary MN). The registration request may include an indication that the registration is for an MA-PDU session with DualSteer Functionality. The AMF of the SMN may use this information to determine whether to accept or to reject the registration to the SMN. A network may want to limit the number of WTRUs that are using its network as a secondary 3GPP leg for DualSteer. For example, the network may be heavily loaded or may have limited resources, and the network may prefer to keep its resources for its own WTRUs (WTRUs that are using the network as a primary MN). In such a case, the network (AMF) may respond with a registration reject and provide a suitable cause (e.g., "SMN rejected—heavy load" or "SMN rejected—limited resources" or "SMN rejected—reserved"). The network (AMF) may additionally include a duration for how long the MN should not be used as a Secondary MN.

In both cases (SMN different from Primary MN and SMN same as Primary MN), if the registration is successful, the WTRU receives a Registration accept message. The Registration accept message may include an indication to the WTRU to start a cell-reselection procedure for the $2^{nd}$ 3GPP access. Alternatively, the Registration accept message may indicate to the WTRU to delay cell-reselection procedures. In one option according to an embodiment, the Registration accept message may include the value (e.g., duration) of this delay, and the WTRU would delay the cell reselection procedure by this amount. In a second option according to an embodiment, the WTRU would rely on service-area-restriction information and/or time-restriction information contained in the SMN information to determine when to start the cell-reselection procedure. For example, the WTRU may delay the cell-reselection procedure until the WTRU location is within the restricted service area. As another example, the WTRU may only perform the cell-reselection procedure based on the time restriction—only when the service for the SMN is available.

In both cases (SMN different from Primary MN and SMN same as Primary MN) if the registration is unsuccessful, then the WTRU receives a Registration reject message. Based on the rejection cause, the WTRU may add the SMN to a list of "MNs not allowed to operate as a Secondary MN". The WTRU may then return to SMN selection and select the next-highest-priority SMN/access technology combination. In this case, the Registration reject message may include a suitable rejection cause value, and an indication for how long the MN should be on the list of "MNs not allowed to operate as Secondary MN". Alternatively, for each rejection cause value, the WTRU may be pre-configured with a duration of how long the MN should be on the list of "MNs not allowed to operate as Secondary MN". For example, rejection cause '1' implies duration 'T1', rejection cause '2' implies duration 'T2', etc.

Relative to WTRU operation over a Selected Secondary MN (SMN), when the WTRU is registered over an SMN, the WTRU performs a set of operations/actions that specifically target SMNs.

A first such operation is deregistration from the SMN. When a WTRU is registered to an SMN, it follows rules to determine when to deregister from the SMN (and possibly to select and to register to another SMN) and when to switch from one SMN/access technology combination to another SMN/access technology combination.

A WTRU may deregister from a SMN based on one or more of the following conditions:

The WTRU loses connectivity to the SMN;

The WTRU location is outside of the service-area restrictions provided in the SMN information;

Time restrictions are such that the WTRU should not use the SMN for DualSteer Functionality;

The WTRU determines that another SMN/access technology combination is better suited for DualSteer Functionality. This may be based on cell signal strength, similar to what is described elsewhere herein for initial SMN selection;

The WTRU receives a message from the SMN that the SMN no longer "wants" to support and/or no longer does support DualSteer Functionality for this WTRU;

The WTRU no longer requires DualSteer Functionality. In such a case, the WTRU may modify the PDU session so that all QoS flows are over an SA-PDU session;

The WTRU may periodically evaluate if a higher-priority SMN/access technology combination is available. If so, the WTRU may use the result of this evaluation as a trigger to deregister from the current SMN and possibly to register to the SMN of the higher-priority SMN/access technology combination; and/or The WTRU no longer has traffic requiring the DualSteer Functionality. If DualSteer Functionality was triggered for a specific SDF, the WTRU may decide to deregister from the SMN if the SDF has ended. If DualSteer Functionality was triggered for a group of SDFs, the WTRU may decide to deregister from the SMN if the group of SDFs has ended. If DualSteer Functionality was triggered for a type of SDF, the WTRU may decide to deregister from the SMN if there are no more SDFs of this type. If DualSteer Functionality was triggered for a specific 5QI, the WTRU may decide to deregister from the SMN if there is no longer any traffic with this specific 5QI.

Subsequently, if needed, the WTRU may start SMN selection again to select a new SMN/access technology combination. The allows a WTRU to deregister from one SMN (SMN1) and to select and to register to a new SMN (SMN2).

A second such operation according to an embodiment involves transferring a $2^{nd}$ 3GPP access leg from a source SMN/access technology combination to a target SMN/access technology combination. In particular, when a WTRU has DualSteer Functionality enabled over a Primary MN and SMN, it may determine that another SMN/access technology combination is better suited for DualSteer Functionality. This may be based on cell signal strength, similar to what is described elsewhere herein for initial SMN selection. In such a case, the WTRU may "want" to move a $2^{nd}$ 3GPP access leg to the target SMN/access technology combination. When a better SMN/access technology combination is found, the WTRU may register to the new SMN (referred to as the target SMN). As part of the registration message for the new SMN, the WTRU may provide the source SMN/access technology combination, and the primary MN. The target SMN will evaluate if it is willing to accept the registration from the WTRU. If the target SMN accepts the WTRU's registration request and registration of the WTRU to the target SMN is successful, then the AMF of the target SMN responds to the WTRU with a registration accept message. Upon reception of the registration accept message, the WTRU deregisters from the source SMN and selects a suitable cell over the target SMN. The WTRU may then send a PDU session modification request to the Primary MN to request that the Primary MN re-establish the MA-PDU session with the target SMN. The SMF of the target SMN then sets up the QoS flows for the MA-PDU session. Alternatively, the WTRU may then send a PDU-session establishment request to the Target SMN to request that the MA-PDU session be re-established. The SMF of the target SMN then sets up the QoS flows for the MA-PDU session.

A third such operation according to an embodiment involves a more seamless mechanism of transferring a $2^{nd}$ 3GPP access leg from a source SMN/access technology combination to a target SMN/access technology combination. In particular, when a WTRU has DualSteer Functionality enabled over a Primary MN and SMN, the WTRU may determine that another SMN/access technology combination is better suited for DualSteer Functionality. This may be based on cell signal strength, similar to what is described elsewhere herein for initial SMN selection. In such a case, the WTRU may "want" to move the $2^{nd}$ 3GPP access leg to the target SMN/access technology combination. As the main use of an SMN is mostly for improved user-plane performance for specific SDFs, and not for providing connectivity to a data network for the WTRU, this third operation allows the WTRU to more seamlessly switch SMNs. The WTRU may regularly monitor the SMN/access technology combinations and determine that a switch in SMN is needed. This may be based on cell signal strength, similar to what is described elsewhere herein for initial SMN selection. When a better SMN/access technology combination is found, the WTRU may register to the new SMN (referred to as the target SMN). As part of the registration message, the WTRU may provide the source SMN/access technology combination, and the primary MN. The WTRU may also include the list of PDU Session IDs that are to be transferred to the target SMN. The target SMN will evaluate if it is "willing" to accept the registration from the WTRU. If so, the target SMN may retrieve the SMF context from the source SMN and set up the SMF context in the target SMN. If the registration is successful, the target SMN responds to the WTRU with a registration accept message. Upon reception of this message, the WTRU registers with the source SMN, and selects a suitable cell over the target SMN. The SMF of the target SMN then sets up the QoS flows for the MA-PDU session.

While registered to an SMN, there may be an advantage to reducing some of the control-plane procedures over the SMN. For example, it may be possible to reduce the number of registration updates over an SMN. A registration update can be used to 1) let the PLMN know that the WTRU is still accessible, 2) provide an indication of the registration area the WTRU is located in, and 3) update WTRU capabilities. For UL transmissions over the $2^{nd}$ 3GPP access, the first two uses (1) and (2) may not be needed. The WTRU may instead 'decide' to perform a registration update or service request procedure before an uplink transmission. For DL transmissions, the network may rely on the Primary MN to signal to the WTRU to perform a registration update or a service-request procedure. The signal may be added by the UPF in a header of the user-plane traffic and sent over the Primary MN. Similarly, it may be possible to avoid sending paging requests over an SMN. Instead, the network may rely on the Primary MN to signal to the WTRU to perform a service-request procedure. The signal may be added by the UPF in a header of the user-plane traffic and sent over the Primary MN. More generally, the WTRU and UPF may use the Primary MN to transmit control-plane messages related to the secondary MN. The exchange over the Primary MN is between the WTRU and UPF, via headers in the user-plane traffic.

Figure 7:
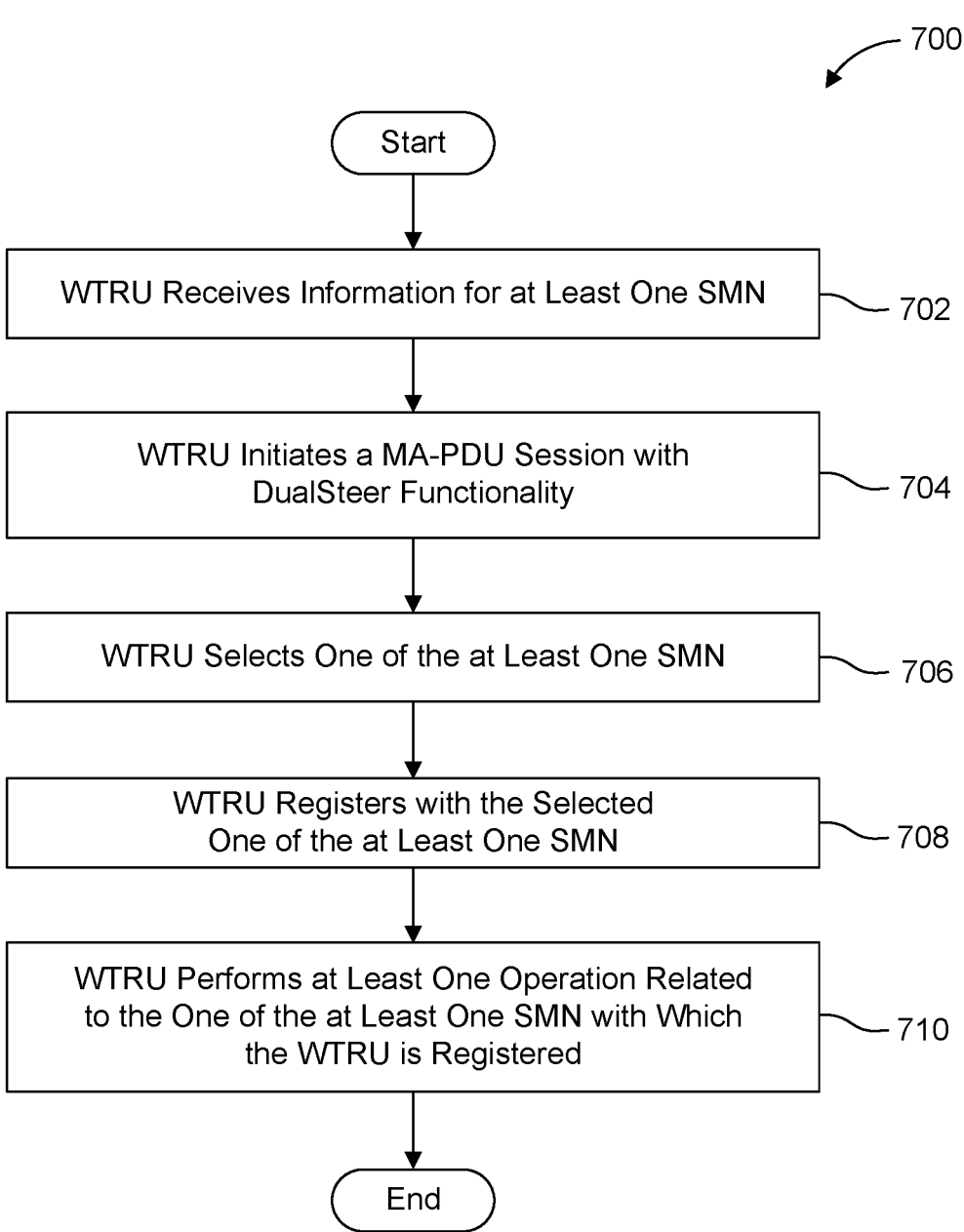
FIG. 7 is a flow diagram of a method (for example, implementable by a WTRU) for selecting and registering with a Secondary Mobile Network (SMN) and then performing an operation related to the SMN, according to an embodiment.

FIG. 7 is a flow diagram 700 of a method for selecting and registering with a Secondary Mobile Network (SMN) and then performing, with a WTRU such as the WTRU 102 of FIG. 1B, an operation related to the SMN, according to an embodiment.

At a step 702, a WTRU, such as the WTRU 102 of FIG. 1B, receives information for at least one SMN.

At a step 704, the WTRU initiates an MA-PDU Session with DualSteer Functionality. The WTRU may initiate the MA-PDU Session with the Primary MN that the WTRU selected and with which the WTRU registered. For example, the WTRU and/or the Primary Mobile Network may establish a 3GPP access leg for communications (e.g., of one or more SDFs) between the WTRU and the Primary Mobile Network.

At a step 706, the WTRU selects an SMN from at least one SMN.

At a step 708, the WTRU registers with the selected SMN.

At a step 710, the WTRU performs at least one operation related to the SMN with which the WTRU is registered. For example, the WTRU and/or the Secondary Mobile Network may establish another 3GPP access leg for communications (e.g., of one or more Service Data Flows (SDFs)) between the WTRU and the Secondary Mobile Network, where the 3GPP access legs are part of, and allow data to flow (e.g., one or more SDFs) via, the MA-PDU session with DualSteer Functionality.

Figure 8:
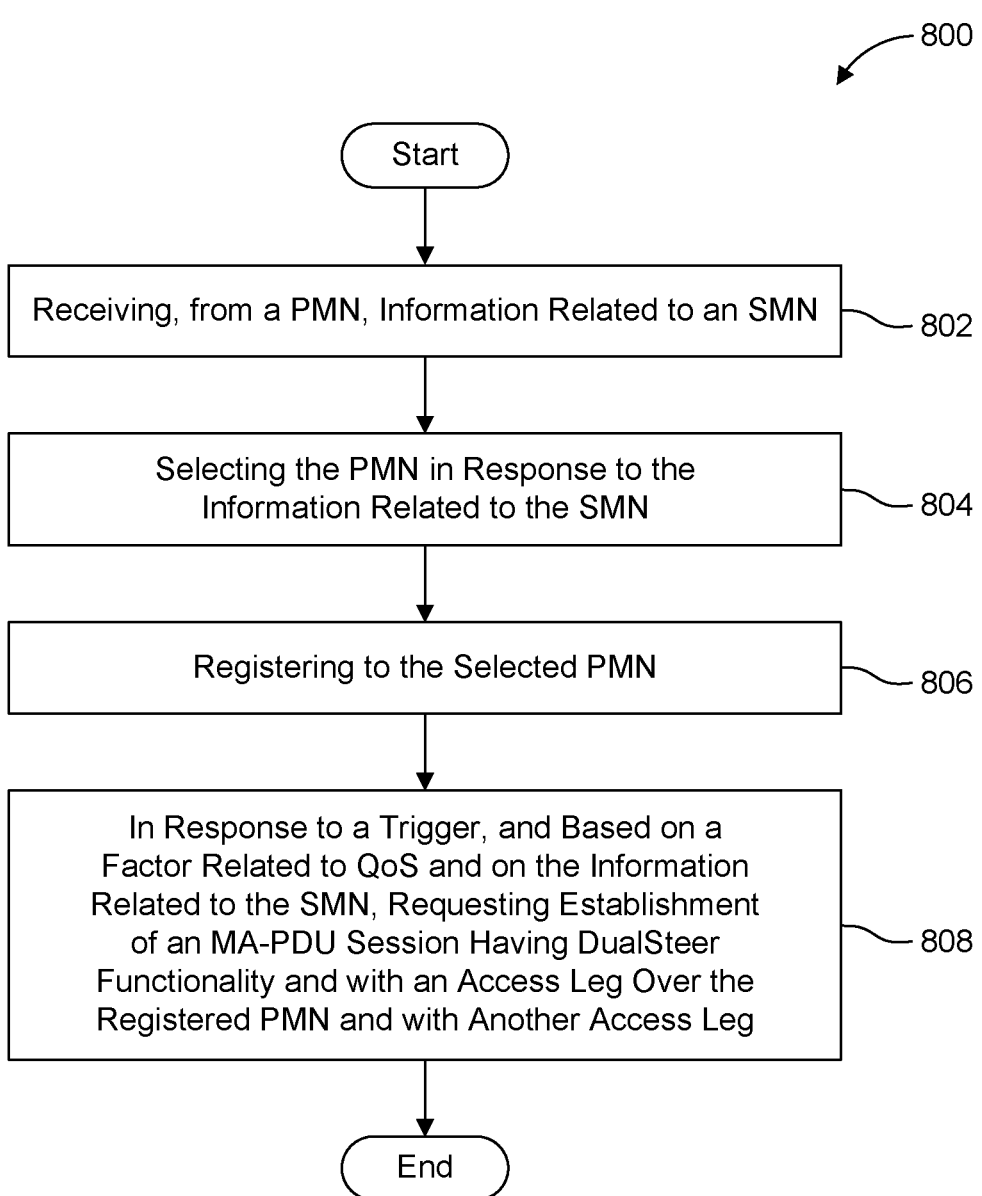
FIG. 8 is a flow diagram of a method for requesting establishment of an MA-PDU Session having DualSteer functionality, the method including selecting and registering to a PMN, according to an embodiment.

FIG. 8 is a flow diagram 800 of a method for requesting establishment of an MA-PDU Session having DualSteer functionality, the method including selecting and registering to a PMN, according to an embodiment.

At 802, a WTRU receives, from a PMN, information related to an SMN. For example, such information may indicate an ID of the SMN, a priority of the SMN, a type of the SMN, an access type supported by the SMN, a service area provided by the SMN, availability of a service provided by the SMN, DNs served by the SMN, QoS performance of the SMN, and/or a type of traffic to be sent and/or received over the SMN.

At 804, the WTRU selects the PMN in response to the information related to the SMN.

At 806, the WTRU registers to the selected PMN.

And, at 808, in response to a trigger (for example, an anticipated data rate), and based on a factor related to QoS and on the information related to the SMN, requesting establishment of an MA-PDU session having DualSteer functionality and with an access leg over the registered PMN and with another access leg.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method for implementation by a Wireless Transmit-Receive Unit (WTRU), the method comprising:

receiving, from a Primary Mobile Network (PMN), information related to a Secondary Mobile Network (SMN);

selecting, by the WTRU, the PMN in response to the information related to the SMN;

registering to the selected PMN; and in response to a trigger evaluated at the WTRU, and based on a factor related to Quality of Service (QoS) and on the information related to the SMN, requesting establishment of a Multi-Access Protocol Data Unit (MA-PDU) session having DualSteer functionality and with an access leg over the registered PMN and with another access leg.

2. The method of claim 1, wherein the information indicates an Identifier (ID) of the SMN, a priority of the SMN, a type of the SMN, an access type supported by the SMN, a service area provided by the SMN, availability of a service provided by the SMN, Data Networks (DNs) served by the SMN, QoS performance of the SMN, and/or a type of traffic to be sent and/or received over the SMN.

3. The method of claim 1, wherein the trigger includes an anticipated data rate.

4. The method of claim 1, wherein at least one of the access legs includes a 3GPP access leg.

5. The method of claim 1, wherein each of the access legs includes a respective 3GPP access leg.

6. The method of claim 1, further comprising deregistering from the selected PMN and selecting another PMN in response to another trigger.

7. The method of claim 1, further comprising receiving, from the PMN, an indication that the PMN supports Dual-Steer functionality.

8. The method of claim 1, further comprising:

initiating a Service Data Flow (SDF) that uses DualSteer functionality; and selecting the PMN in response to initiating the SDF.

9. The method of claim 1, wherein requesting establishment of the MA-PDU session includes transmitting an MA-PDU session request that identifies a supported access type for a 2nd 3GPP access leg.

10. The method of claim 1, further comprising:

selecting and registering to an SMN; and transmitting and/or receiving a PDU using an established MA-PDU session having DualSteer functionality and with an access leg over the registered PMN and with another access leg over the registered SMN.

11. A Wireless Transmit-Receive Unit (WTRU) comprising: a processor; and a transceiver, wherein the processor and the transceiver are configured to:

receive, from a Primary Mobile Network (PMN), information related to a Secondary Mobile Network (SMN);

select the PMN in response to the information related to the SMN;

register to the selected PMN; and in response to a trigger evaluated at the WTRU, and based on a factor related to Quality of Service (QoS) and on the information related to the SMN, request establishment of a Multi-Access Protocol Data Unit (MA-PDU) session having DualSteer functionality and with an access leg over the registered PMN and with another access leg.

12. The WTRU of claim 11, wherein the information indicates an Identifier (ID) of the SMN, a priority of the SMN, a type of the SMN, access type supported by the SMN, a service area provided by the SMN, availability of a service provided by the SMN, Data Networks (DNS) served by the SMN, QoS performance of the SMN, and/or a type of traffic to be sent and/or received over the SMN.

13. The WTRU of claim 11, wherein the trigger includes an anticipated data rate.

14. The WTRU of claim 11, wherein at least one of the access legs includes a 3GPP access leg.

15. The WTRU of claim 11, wherein each of the access legs includes a respective 3GPP access leg.

16. The WTRU of claim 11, wherein the processor and transceiver are further configured to:

deregister from the selected PMN; and select another PMN in response to another trigger.

17. The WTRU of claim 11, wherein the processor and transceiver are further configured to receive, from the PMN, an indication that the PMN supports DualSteer functionality.

18. The WTRU of claim 11, wherein the processor and transceiver are further configured to:

initiate a Service Data Flow (SDF) that uses DualSteer functionality; and select the PMN in response to initiating the SDF.

19. The WTRU of claim 11, wherein the WTRU is the processor and transceiver are further configured to request establishment of the MA-PDU session by transmitting an MA-PDU session request that identifies a supported access type for a 2nd 3GPP access leg.

20. The WTRU of claim 11, wherein the processor and transceiver are further configured to:

select and register to an SMN; and transmit and/or receive a PDU using an established MA-PDU session having DualSteer functionality and with an access leg over the registered PMN and with another access leg over the registered SMN.

\* \* \* \* \*